US007612838B2

(12) United States Patent
Lim et al.

(10) Patent No.: US 7,612,838 B2
(45) Date of Patent: Nov. 3, 2009

(54) THIN FILM TRANSISTOR ARRAY SUBSTRATE, LIQUID CRYSTAL DISPLAY PANEL HAVING THE SAME, AND METHOD OF MANUFACTURING THIN FILM TRANSISTOR ARRAY SUBSTRATE AND LIQUID CRYSTAL DISPLAY PANEL

(75) Inventors: Byoung Ho Lim, Kyoungsangbuk-do (KR); Soon Sung Yoo, Kyounggi-do (KR); Youn Gyoung Chang, Kyounggi-do (KR); Heung Lyul Cho, Kyounggi-do (KR)

(73) Assignee: LG Display Co., Ltd., Seoul (KR)

( * ) Notice: Subject to any disclaimer, the term of this patent is extended or adjusted under 35 U.S.C. 154(b) by 166 days.

(21) Appl. No.: 10/960,545

(22) Filed: Oct. 8, 2004

(65) Prior Publication Data

US 2005/0078254 A1    Apr. 14, 2005

(30) Foreign Application Priority Data

Oct. 10, 2003  (KR) ............... 10-2003-0070702
Dec. 30, 2003  (KR) ............... 10-2003-0100872

(51) Int. Cl.
    *G02F 1/136*  (2006.01)
(52) U.S. Cl. ............... 349/43; 349/129; 349/143
(58) Field of Classification Search ............... None
    See application file for complete search history.

(56) References Cited

U.S. PATENT DOCUMENTS 5,854,663 A * 12/1998 Oh et al. ............... 349/42
5,907,380 A * 5/1999 Lien ............... 349/141
6,356,335 B1 * 3/2002 Kim et al. ............... 349/156
6,448,579 B1 * 9/2002 Lim et al. ............... 257/59
6,657,695 B1 * 12/2003 Song et al. ............... 349/143
6,661,488 B1 * 12/2003 Takeda et al. ............... 349/117
2002/0039164 A1   4/2002 Song
2002/0167009 A1   11/2002 Kim

FOREIGN PATENT DOCUMENTS

| CN | 1354383 | 6/2002 |
|----|---------|--------|
| CN | 1385743 | 12/2002 |
| JP | 7-311383 | 11/1995 |
| JP | 11-242225 | 9/1999 |
| JP | 11-352489 | 12/1999 |
| JP | 2001-51298 | 2/2001 |
| KR | 2001-046329 | 6/2001 |
| KR | 2001-104067 | 11/2001 |

* cited by examiner

*Primary Examiner*—David Nelms
*Assistant Examiner*—Lucy P Chien
(74) *Attorney, Agent, or Firm*—Morgan Lewis & Bockius LLP

(57) ABSTRACT

A thin film transistor array substrate for a liquid crystal display panel includes a gate line formed on a substrate. A data line crosses the gate line, thus defining a pixel region. A gate insulating film is positioned between the data line and the gate line. A thin film transistor is formed at a crossing of the gate line and the data line. A passivation film pattern exposes a portion of a drain electrode of the thin film transistor. At least one protrusion is provided to divide the pixel region into a plurality of regions, each of the regions having a different liquid crystal alignment from the other regions. A pixel electrode is connected to the thin film transistor to cover the pixel region excluding the passivation film pattern and the at least one protrusion.

13 Claims, 31 Drawing Sheets

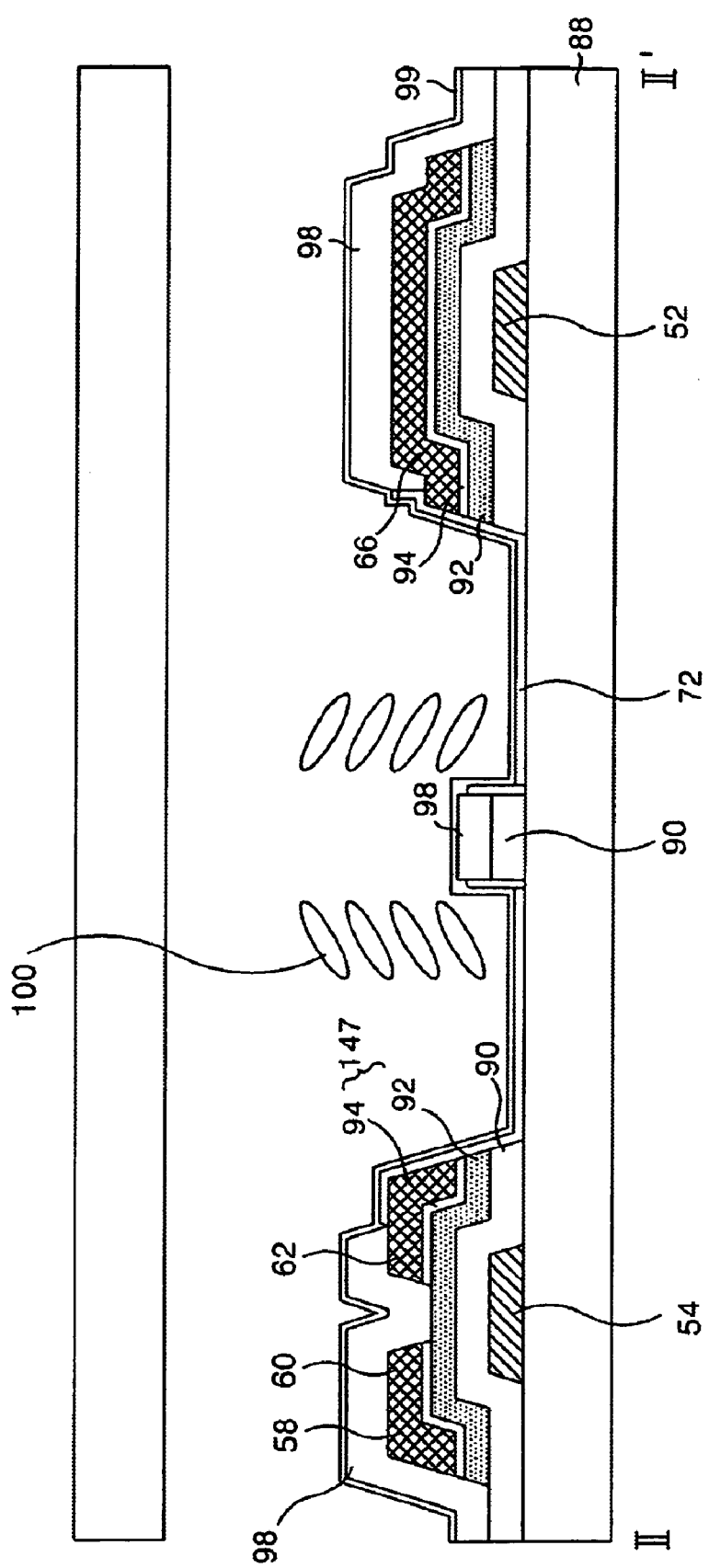

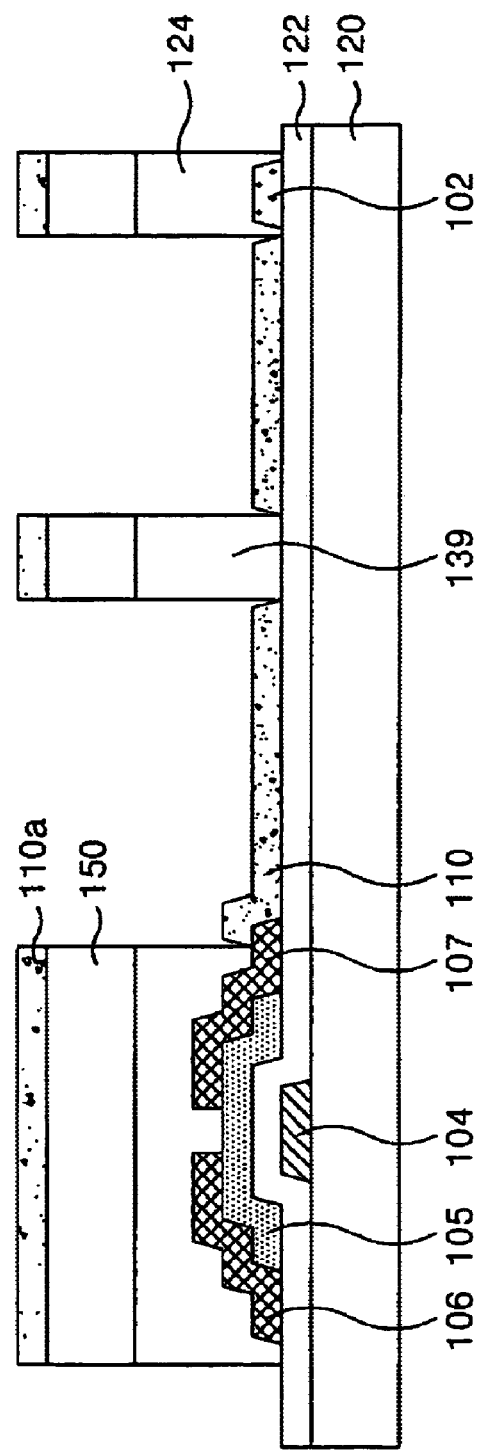

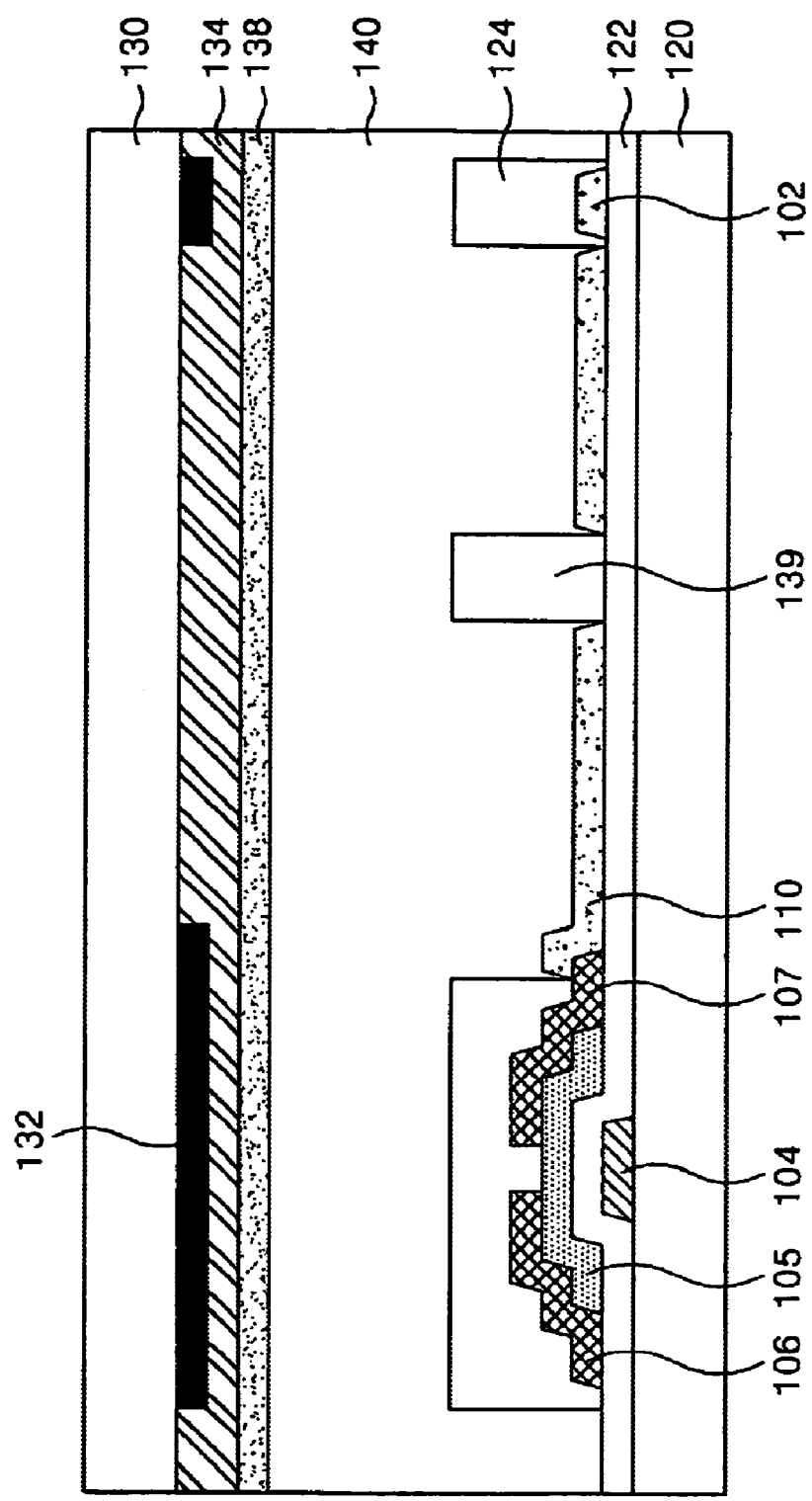

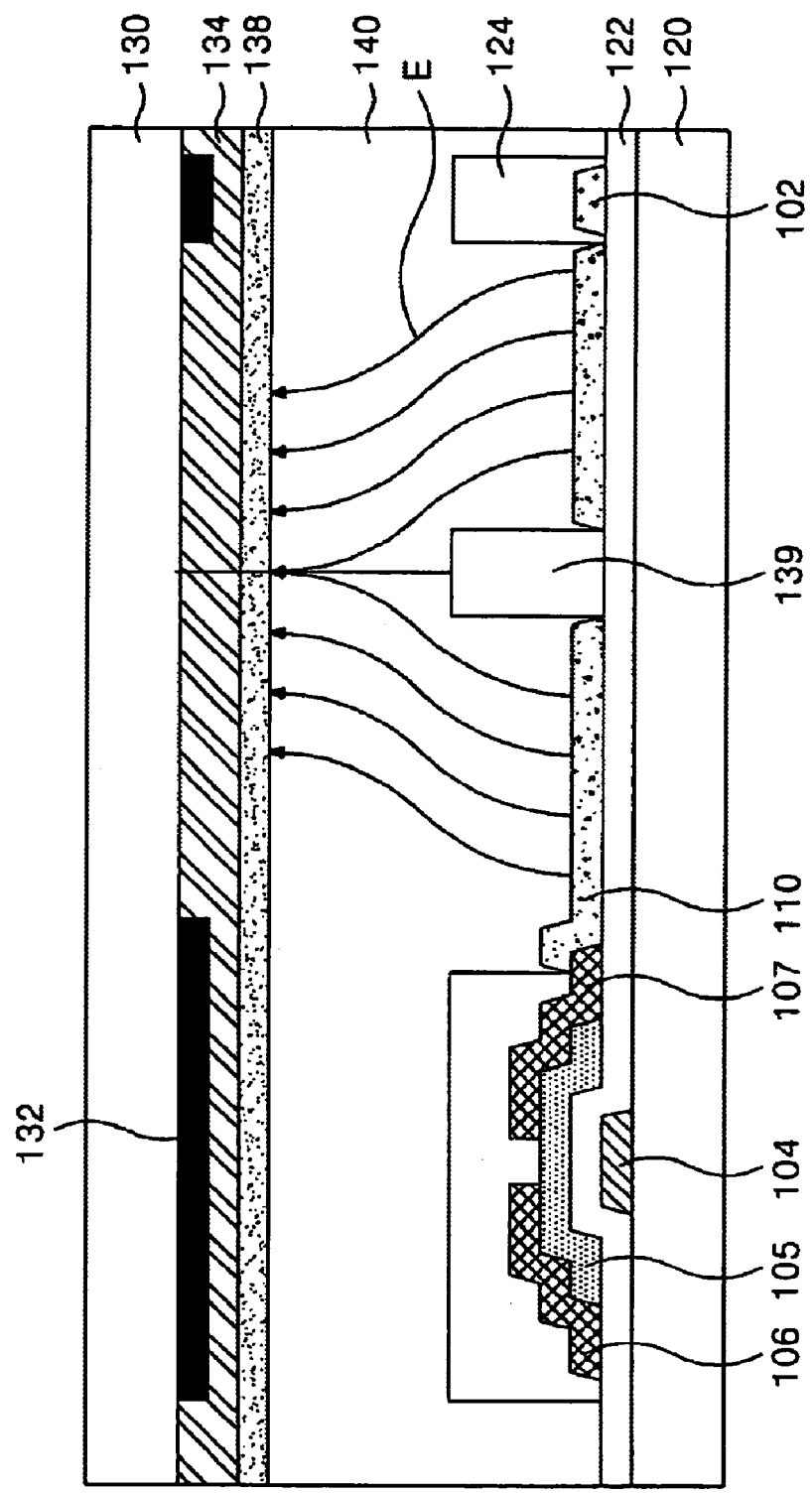

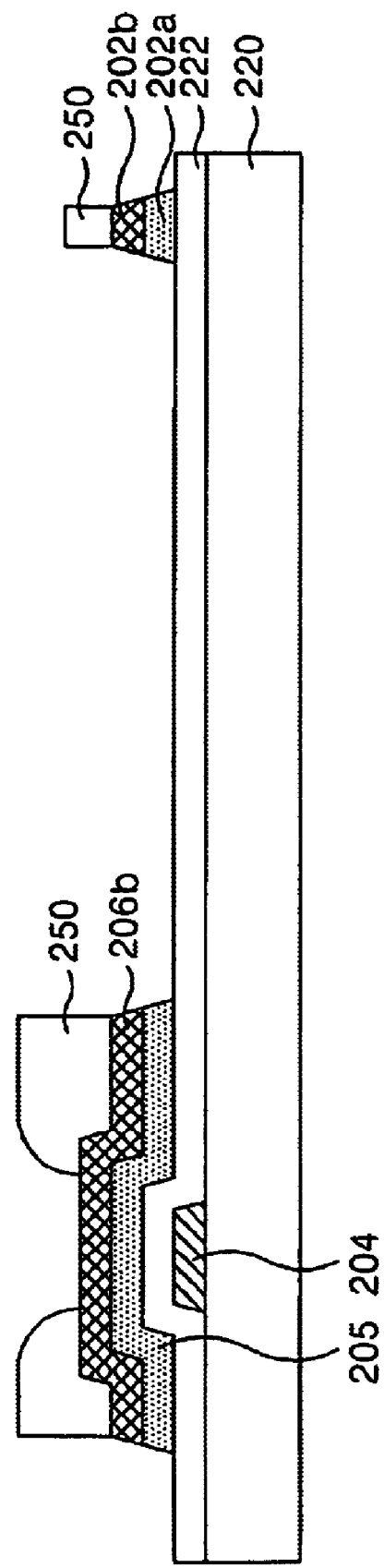

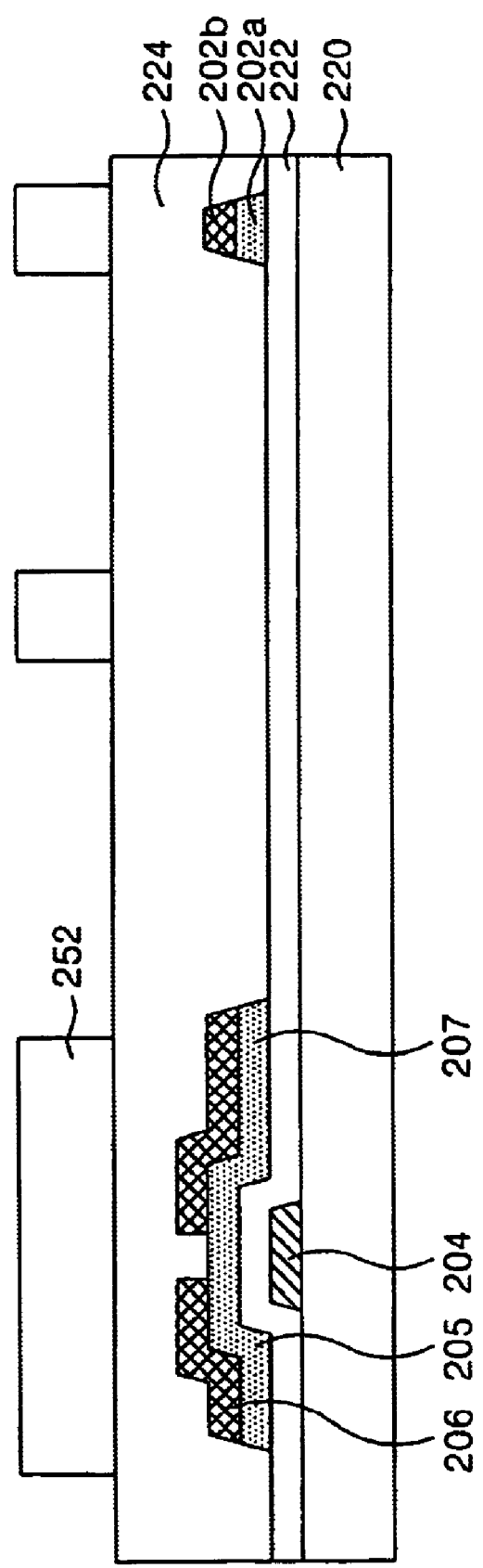

THIN FILM TRANSISTOR ARRAY SUBSTRATE, LIQUID CRYSTAL DISPLAY PANEL HAVING THE SAME, AND METHOD OF MANUFACTURING THIN FILM TRANSISTOR ARRAY SUBSTRATE AND LIQUID CRYSTAL DISPLAY PANEL

The present invention claims the benefit of Korean Patent Application Nos. P2003-100872 and P2003-70702 filed in Korea on Dec. 30, 2003 and Oct. 10, 2003, respectively, which are hereby incorporated by reference.

BACKGROUND OF THE INVENTION

1. Field of the Invention

The present invention relates to a thin film transistor array substrate, a liquid crystal display panel having the same, and a method of manufacturing the thin film transistor array substrate and the liquid crystal display panel, and more particularly, to a thin film transistor array substrate, a liquid crystal display panel having the same, and a method of manufacturing the thin film transistor array substrate and the liquid crystal display panel with a reduced number of mask processes.

2. Description of the Related Art

In general, a liquid crystal display device outputs an image by adjusting a transmittance of a liquid crystal material with an applied electric field. For this purpose, the liquid crystal display device includes a liquid crystal display panel in which liquid crystal cells are arranged in a matrix pattern, and a driving circuit for driving the liquid crystal display panel. Specifically, the liquid crystal display panel includes a thin film transistor array substrate and a color filter array substrate facing each other, a spacer for maintaining a cell gap between the array substrates, and a liquid crystal injected within the cell gap. The color filter array substrate includes color filters including liquid crystal cells, a black matrix reflecting external light and separating the color filters, a common electrode supplying a reference voltage to the liquid crystal cells, and an alignment film provided on the liquid crystal cells.

The thin film transistor array substrate includes gate lines and data lines. A thin film transistor is formed as a switching device at every crossing of the gate lines and the data lines. A pixel electrode is connected to the formed thin film transistor. An alignment film is provided on the liquid crystal cells. The gate lines and the data lines receive signals from the driving circuits through each of a plurality of pad parts. The thin film transistor supplies a pixel voltage signal to the pixel electrode in response to a scan signal provided through a gate line. The pixel voltage signal is provided through a data line.

The liquid crystal display panel is fabricated by combining the thin film transistor array substrate and the color filter array substrate which are separately manufactured. The liquid crystal material is injected between the substrates. The substrates are then sealed with the liquid crystal material between them. When fabricating such a liquid crystal display device, since the thin film transistor array substrate involves a semiconductor process and requires a plurality of mask processes, the manufacturing process for the thin film transistor array substrate is complicated and results in high costs associated with manufacturing the liquid crystal display panel.

In order to reduce manufacturing costs, a reduction in the number of mask processes is sought. Each mask process includes many processes such as thin film deposition, cleaning, photolithography, etching, photo-resist stripping, inspection processes and the like. Recently, a four mask process has been introduced. The four mask process is obtained from an existing five mask process, which is commonly used.

FIG. 1 is a plan view illustrating a portion of a thin film transistor array substrate according to a related art arrangement. FIG. 2 is a sectional view of the related art thin film transistor array substrate taken along the line I-I' in FIG. 1. Referring to FIGS. 1 and 2, the thin film transistor array substrate includes gate lines 2 and data lines 4 crossing each other. A gate insulating film 44 is disposed on a lower substrate 42 between the gate lines 2 and the data lines 4. A thin film transistor 6 is formed at each crossing of the gate lines and the data lines. A pixel electrode 18 is formed in the cell region defined by the crossings of the gate lines and data lines. The thin film transistor array substrate further includes a storage capacitor 20, a gate pad part 26 and a data pad part 34. The storage capacitor 20 is formed at an overlapped part of the pixel electrode 18 and a pre-stage gate line 2. The gate pad part 26 is connected to the gate line 2. The data pad part 34 is connected to the data line 4.

The thin film transistor 6 includes a gate electrode 8, a source electrode 10, a drain electrode 12, and an active layer 14 of a semiconductor pattern 47. The gate electrode 8 is connected to the gate line 2. The source electrode 10 is connected to the data line 4. The drain electrode 12 is connected to a pixel electrode 18. The active layer 14 of semiconductor pattern 47 defines a channel region between the source electrode 10 and the drain electrode 12 and overlaps the gate electrode 8.

The active layer 14 overlaps a lower data pad electrode 36, a storage electrode 22, the data line 4, the source electrode 10 and the drain electrode 12. The active layer 14 includes a channel portion defined between the source electrode 10 and the drain electrode 12. An ohmic contact-layer 48 is further formed on the active layer 14. The ohmic contact layer 48 of the semiconductor pattern 47 contacts the lower data pad electrode 36, the storage electrode 22, the data line 4, the source electrode 10, the drain electrode 12. The thin film transistor 6, in response to the gate signal supplied to the gate line 2, charges and maintains a pixel voltage signal, which is supplied through the data line 4, in the pixel electrode 18.

The pixel electrode 18 is connected to the drain electrode 12 of the thin film transistor 6 via a first contact hole 16 passing through a passivation film 50. The pixel voltage charged across the pixel electrode 18 causes a potential difference with respect to the common electrode formed on an upper substrate (not shown). The liquid crystal material located between the thin film transistor substrate and the upper substrate rotates under the influence of this potential difference, due to a dielectric anisotropy. The rotated crystal material transmits incident light emitted by the light source (not shown) to the upper substrate through the pixel electrode 18.

The storage capacitor 20 includes a pre-stage gate line 2, a storage electrode 22, and the pixel electrode 18. The storage electrode 22 overlaps the pre-stage gate line 2 with the gate insulating film 44, the active layer 14 and the ohmic contact layer 48 therebetween. The pixel electrode 18 is connected through a second contact hole 24 formed at the passivation film 50 and overlaps the storage electrode 22 having the passivation film 50 therebetween. The storage capacitor 20 charges the pixel voltage to the pixel electrode 18 and maintains a stable voltage until a next pixel voltage is charged.

The gate line 2 is connected to a gate driver (not shown) through the gate pad part 26. The gate pad part 26 includes a lower gate pad electrode 28 and an upper gate pad electrode 32. The lower gate pad electrode 28 extends from the gate line 2. The upper gate pad electrode 32 is connected to the lower gate pad electrode 28 via a third contact hole 30, which passes through both of the gate insulating film 44 and the passivation film 50.

The data line 4 is connected to a data driver (not shown) through the data pad part 34. The data pad part 34 includes the lower data pad electrode 36 and an upper data pad electrode 40. The lower data pad electrode 36 extends from the data line 4. The upper data pad electrode 40 is connected to the lower data pad electrode 36 via a fourth contact hole 38 passing through the passivation film 50. The thin film transistor substrate having the above-mentioned configuration is formed through the use of the four mask process.

FIGS. 3A to 3D are sectional views sequentially illustrating a method of manufacturing the related art thin film transistor array substrate shown in FIG. 2. Referring to FIG. 3A, gate patterns are formed on the lower substrate 42. A gate metal layer is formed on the lower substrate 42 by a deposition method such as sputtering method. The gate metal layer is subsequently patterned by a photolithography process using a first mask and an etching process to thereby form the gate patterns, which include the gate line 2, the gate electrode 8 and the lower gate pad electrode 28. A material for the gate metal layer includes chrome (Cr), molybdenum (Mo), aluminium (Al) and the like, which are used in a form of a single-layer structure or a double-layer structure.

Referring to FIG. 3B, the gate insulating film 44, the active layer 14, the ohmic contact layer 48 and source/drain patterns are sequentially formed on the lower substrate 42 provided with the gate pattern. The gate insulating film 44, an amorphous silicon layer, a $n^+$ amorphous silicon layer and a source/drain metal layer are sequentially formed on the lower substrate 42 having the gate patterns thereon by a deposition technique such as a plasma enhanced chemical vapor deposition (PECVD) and sputtering.

A photo-resist pattern is formed on the source/drain metal layer by a photolithography process using a second mask. In this case, the second mask is a diffractive exposure mask having a diffractive exposing part wherein the diffractive exposing part corresponds to a channel portion of the thin film transistor. The resulting photo-resist pattern of the channel portion has a lower height than a photo-resist pattern of the source/drain pattern part.

The source/drain metal layer is subsequently patterned by a wet etching process using the photo-resist pattern, thereby forming source/drain patterns including the data line 4, the source electrode 10, the drain electrode 12 being integral to the source electrode 10 and the storage electrode 22.

Next, the amorphous silicon layer and the $n^+$ amorphous silicon layer are simultaneously patterned by a dry etching process using the same photo-resist pattern. The resulting semiconductor pattern 47 includes the ohmic contact layer 48 and the active layer 14. The photo-resist pattern having a relatively low height in the channel portion is removed by an ashing process and thereafter the source/drain pattern and the ohmic contact layer 48 of the channel portion are etched by a dry etching process. Accordingly, the active layer 14 of the channel portion is exposed to separate the source electrode 10 from the drain electrode 12. Thereafter, a remainder of the photo-resist pattern left on the source/drain pattern is removed by a stripping process.

Referring to FIG. 3C, the passivation film 50 is formed on the gate insulating film 44 including the source/drain patterns. The passivation film 50 is formed by a deposition technique such as a PECVD. The passivation film 50 includes first to fourth contact holes 16, 24, 30 and 38. The passivation film 50 is subsequently patterned by photolithography using a third mask and an etching process to thereby form the first to fourth contact holes 16, 24, 30 and 38. The first contact hole 16 passes through the passivation film 50 and exposes the drain electrode 12. The second contact hole 24 passes through the passivation film 50 and exposes the storage electrode 22. The third contact hole 30 passes through the passivation film 50 and the gate insulating film 44 and exposes the lower gate pad electrode 28. The fourth contact hole 38 passes through the passivation film 50 and exposes the lower data pad electrode 36.

The gate insulating film 44 is made of an inorganic insulating material such as silicon oxide ($SiO_x$) or silicon nitride ($SiN_x$). The passivation film 50 is made of an inorganic insulating material such as that of the gate insulating film 44 or an organic insulating material having a small dielectric constant such as an acrylic organic compound, BCB (benzocyclobutene) or PFCB (perfluorocyclobutane). A metal for the source/drain pattern includes molybdenum (Mo), titanium (Ti), tantalum (Ta), or molybdenum alloy.

Referring to FIG. 3D, transparent electrode patterns are formed on the passivation film 50. More specifically, a transparent electrode material is entirely deposited on the passivation film 50 by a deposition technique such as sputtering and the like. Then, the transparent electrode material is patterned by photolithography using a fourth mask and an etching process. The resulting transparent electrode patterns includes the pixel electrode 18, the upper gate pad electrode 32 and the upper data pad electrode 40. The pixel electrode 18 is electrically connected, via the first contact hole 16, to the drain electrode 12 while being electrically connected, via the second contact hole 24, to the storage electrode 22 overlapping a pre-stage gate line 2. The upper gate pad electrode 32 is electrically connected, via the third contact hole 30, to the lower gate pad electrode 28. The upper data pad electrode 40 is electrically connected, via the fourth contact hole 38, to the lower data pad electrode 36. In this connection, the transparent electrode material is made of an indium-tin-oxide (ITO), a tin-oxide (TO) or an indium-zinc-oxide (IZO).

As described above, the related art thin film transistor array substrate and the manufacturing method thereof adopts a four mask process. The four mask process simplifies the manufacturing processes compared with the five mask process and reduces manufacturing cost accordingly. However, since the four mask process is still complex and provides only limited reduction in manufacturing cost, a simpler manufacturing process with further reduction in manufacturing cost is needed.

Meanwhile, a liquid crystal display device of vertical electric field type drives a liquid crystal material of a twisted nematic mode (TN) by a vertical electric field formed between a common electrode and a pixel electrode. In the liquid crystal display device of vertical electric field type, the common electrode is formed on an upper substrate and the pixel electrode is formed on a lower substrate. The common electrode and the pixel electrode face each other. While the liquid crystal display device of vertical electric field type provides a large aperture ratio, it has a narrow viewing angle of about 90°. Accordingly, a liquid crystal display panel with a compensated viewing angle is needed.

SUMMARY OF THE INVENTION

Accordingly, the present invention is directed to a thin film transistor array substrate, a liquid crystal display panel having the same, and a method of manufacturing the thin film transistor array substrate and the liquid crystal display panel, that substantially obviate one or more of the problems due to limitations and disadvantages of the related art.

An object of the present invention is to provide a thin film transistor array substrate having a simplified structure.

An object of the present invention is to provide a thin film transistor array substrate having a large viewing angle.

Another object of the present invention is to provide a liquid crystal display panel including a thin film transistor array substrate having a simplified structure.

Another object of the present invention is to provide a liquid crystal display panel including a thin film transistor array substrate having a large viewing angle.

Another object of the present invention is to provide a simple method of manufacturing a thin film transistor array substrate with a simplified structure.

Another object of the present invention is to provide a simple method of manufacturing a thin film transistor array substrate with a large viewing angle.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described herein, the thin film transistor array substrate for a liquid crystal display panel includes a gate line formed on a substrate. A data line crosses the gate line, thus defining a pixel region. A gate insulating film is positioned between the data line and the gate line. A thin film transistor is formed at a crossing of the gate line and the data line. A passivation film pattern exposes a portion of a drain electrode of the thin film transistor. At least one protrusion is provided to divide the pixel region into a plurality of regions, each of the regions having a different liquid crystal alignment from the other regions. A pixel electrode is connected to the thin film transistor to cover the pixel region excluding the passivation film pattern and the at least one protrusion.

In another aspect, the liquid crystal display panel includes a thin film transistor array substrate and a color filter array substrate. The thin film transistor array substrate includes a gate line formed on a substrate; a data line crossing the gate line, thus defining a pixel region; a gate insulating film positioned between the data line and the gate line; a thin film transistor formed at a crossing of the gate line and the data line; a passivation film pattern exposing a portion of a drain electrode of the thin film transistor; protrusions dividing the pixel region into a plurality of regions, each of the regions having a different liquid crystal alignment from the other regions; and a pixel electrode connected to the thin film transistor, and formed in the pixel region excluding the passivation film pattern and the protrusions. The color filter array substrate faces the thin film transistor array substrate, and includes a thin film having a slit formed between the protrusions.

In yet another aspect, the method of manufacturing a thin film transistor array substrate includes forming a gate pattern, including a gate electrode of a thin film transistor and a gate line connected to the gate electrode, on a substrate; forming a gate insulating film on the substrate, covering the gate pattern; forming a source electrode and a drain electrode of the thin film transistor, a data line crossing the gate line to define a pixel region, a source/drain pattern including the data line, and a semiconductor pattern defining a channel between the source electrode and the drain electrode; forming a transparent electrode pattern covering at least the pixel region; forming a passivation film pattern covering an area excluding the transparent electrode pattern; and forming at least one protrusion dividing the pixel region into a plurality of regions, each of the regions having a different liquid crystal alignment from the other regions.

In still another aspect, the method of manufacturing a liquid crystal display panel includes preparing a thin film transistor array substrate. The thin film transistor array substrate includes a gate line formed on a substrate; a data line crossing the gate line with a gate insulating film positioned therebetween to define a pixel region; a thin film transistor formed at a crossing of the gate line and the data line; a passivation film pattern exposing a portion of a drain electrode of the thin film transistor; protrusions dividing the pixel region into a plurality of regions each of which having a different liquid crystal alignment from the others; and a pixel electrode connected to the thin film transistor, covering the pixel region excluding the passivation film pattern and the protrusions. The method also includes preparing a color filter array substrate to face the thin film transistor array substrate, and joining the thin film transistor array substrate to the color filter array substrate. The color filter array substrate includes a thin film having a slit formed between the protrusions.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings:

FIG. 7 is a diagram depicting a formation of exemplary multi-domains of alignments of liquid crystal molecules in the thin film transistor array substrate according to an embodiment of the present invention;

FIG. 8E is a sectional view illustrating the formation of an exemplary pixel electrode pattern by a method of manufacturing a liquid crystal display panel with a vertical alignment mode according to another embodiment of the present invention;

FIG. 8F is a sectional view illustrating the formation of exemplary upper layers of a liquid crystal display panel using a vertical alignment mode according to another embodiment of the present invention;

FIG. 8G is a sectional view illustrating a distortion of a electric field around a protrusion in an exemplary liquid crystal display panel with a vertical alignment mode according to another embodiment of the present invention;

FIG. 11C is a sectional view illustrating the formation of a metal pattern by a method of manufacturing a liquid crystal display panel with a vertical alignment mode according to another embodiment of the present invention;

FIG. 11D is a sectional view illustrating the formation of a source electrode and a drain electrode by a method of manufacturing a liquid crystal display panel with a vertical alignment mode according to another embodiment of the present invention;

DETAILED DESCRIPTION OF THE PREFERRED EMBODIMENT

Reference will now be made in detail to the preferred embodiments of the present invention, examples of which are illustrated in the accompanying drawings.

Figure 1:
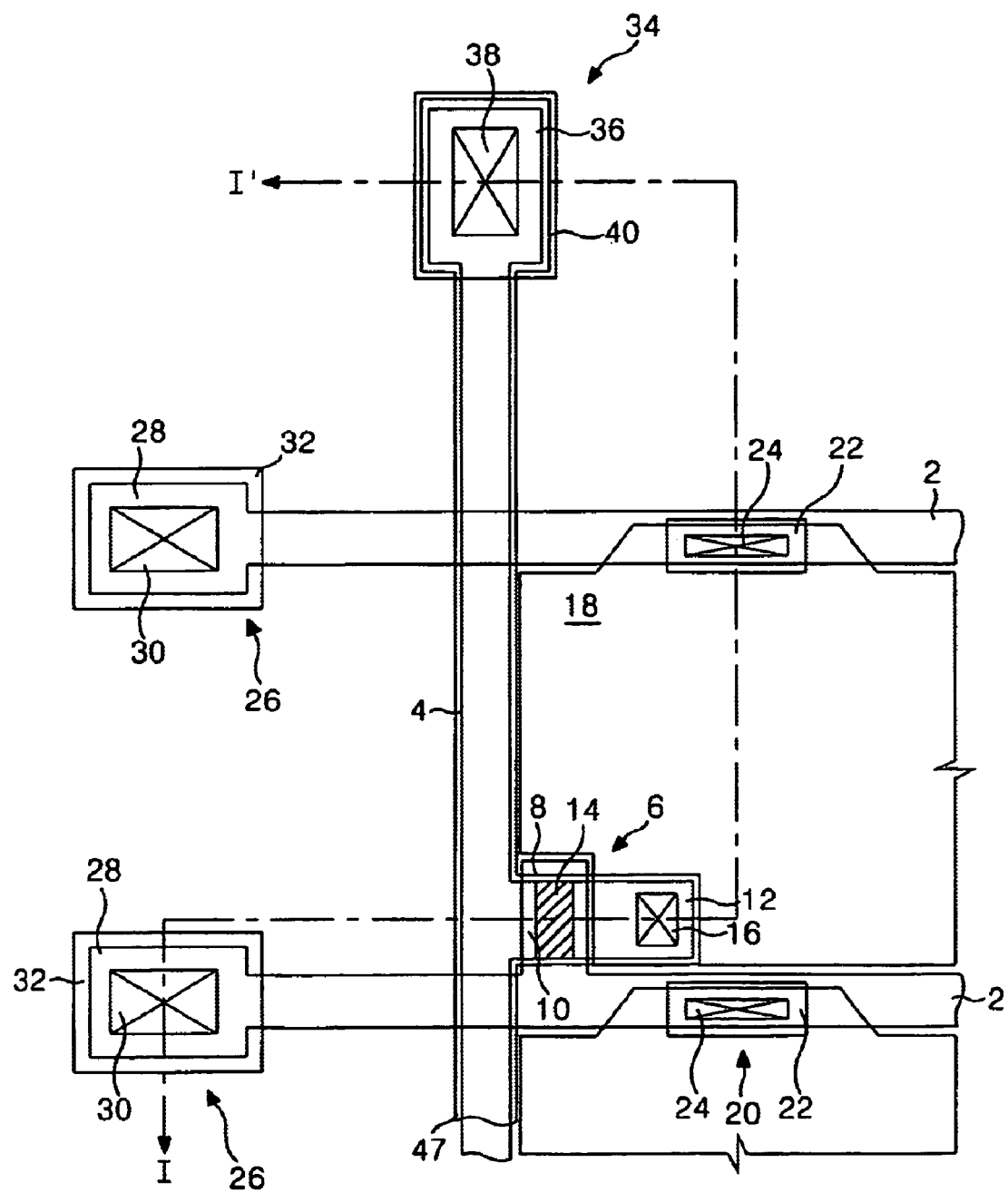
FIG. 1 is a plan view illustrating a portion of a thin film transistor array substrate according to a related art arrangement.
Figure 2:
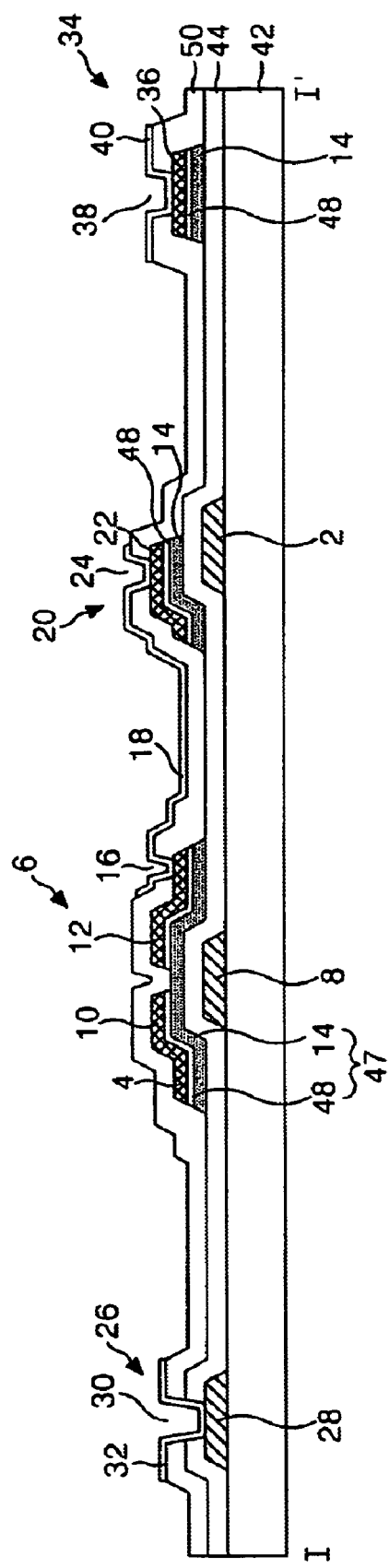
FIG. 2 is a sectional view of the related art thin film transistor array substrate taken along the line I-I' in FIG. 1.
Figure 3A:
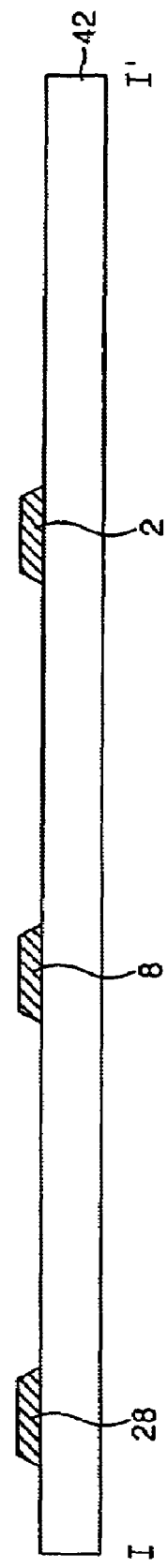
FIGS. 3A to 3D are sectional views sequentially illustrating a method of manufacturing the related art thin film transistor array substrate shown in FIG. 2.
Figure 3B:
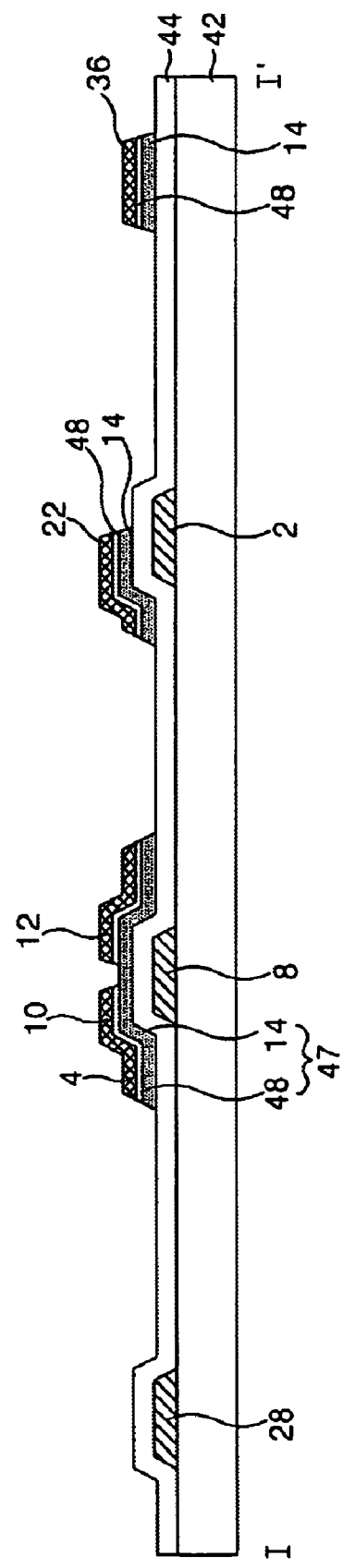
Figure 3C:
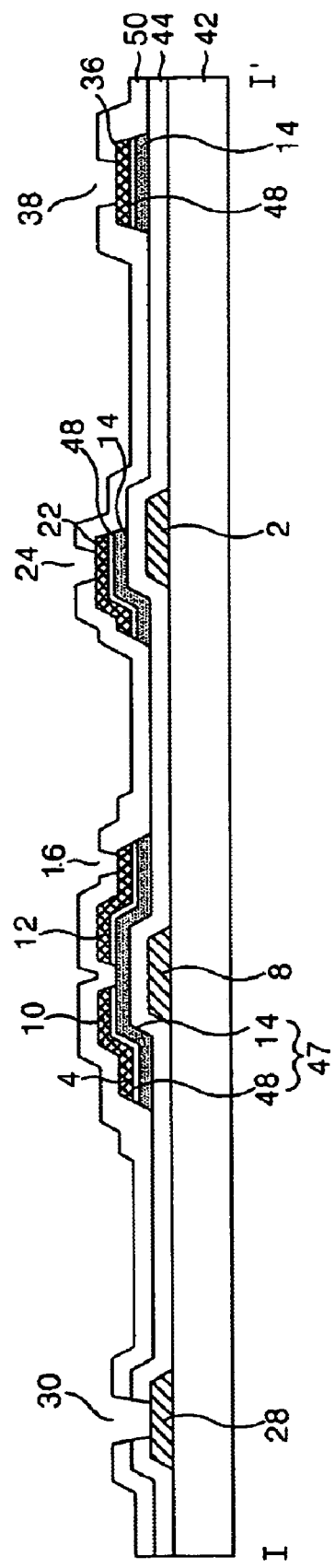
Figure 3D:
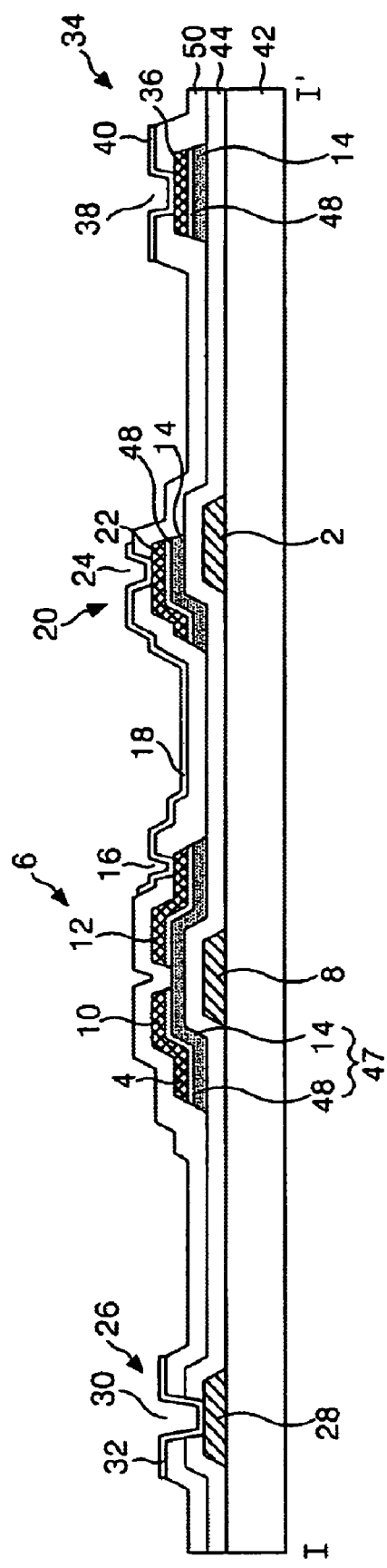
Figure 4:
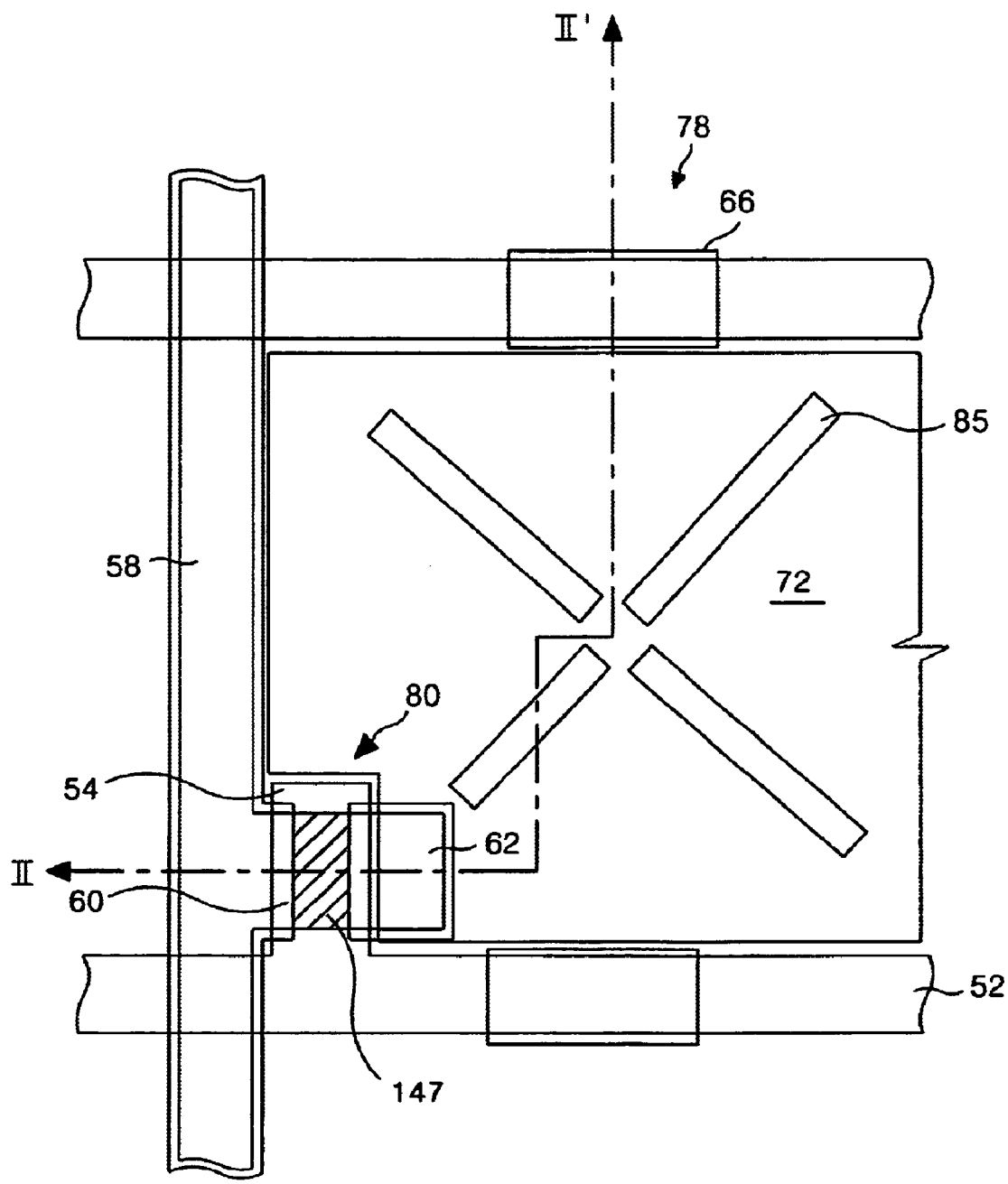
FIG. 4 is a plan view of an exemplary thin film transistor array substrate according to a first embodiment of the present invention.
Figure 5:
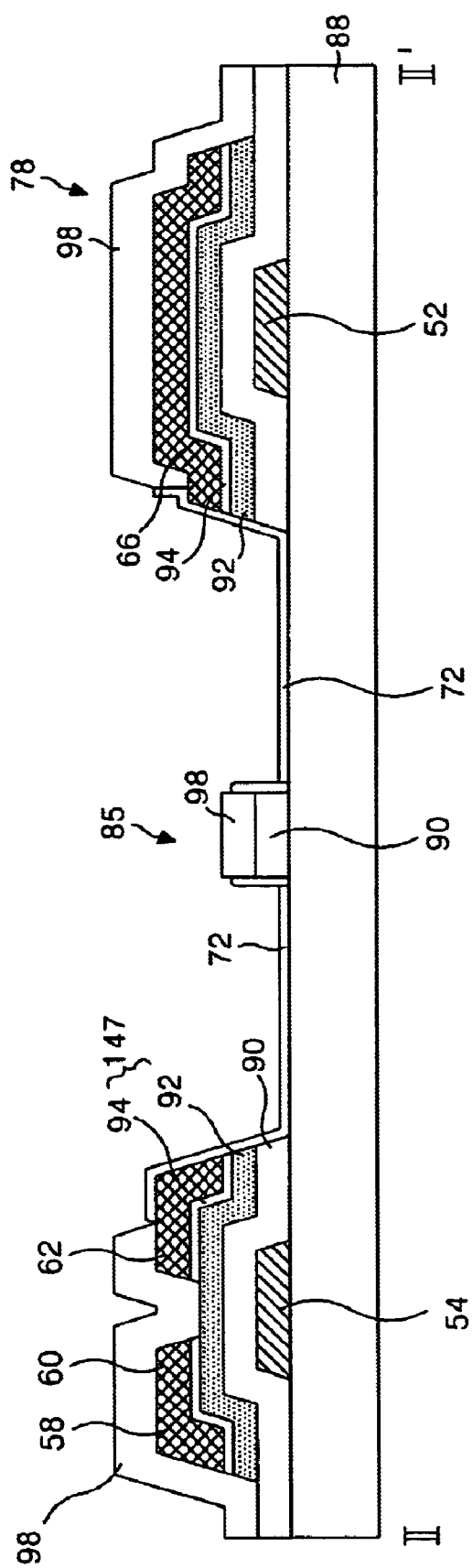
FIG. 5 is a sectional view of the exemplary thin film transistor array substrate taken along the line II-II' in FIG. 4.

FIG. 4 is a plan view of an exemplary thin film transistor array substrate according to a first embodiment of the present invention. FIG. 5 is a sectional view of the exemplary thin film transistor array substrate taken along the line II-II' in FIG. 4. Referring to FIGS. 4 and 5, the thin film transistor array substrate includes a gate line 52 and a data line 58 crossing each other. The thin film transistor also includes a gate insulating pattern 90 between the gate line 52 and the data line 58. The gate insulating pattern is formed on a lower substrate 88. A thin film transistor 80 is formed at a crossing of the gate line and data line. A pixel electrode 72 is disposed in a pixel region defined by the crossing of the gate line and the data line. At least one protrusion 85 is formed across the pixel region and crossing the pixel electrode 72. The thin film transistor array substrate further includes a storage capacitor 78, a gate pad part (not shown), and a data pad part (not shown). The storage capacitor 78 is formed at an overlapped portion between a pre-stage gate line 52 and a storage electrode 66. The storage electrode 66 is connected to the pixel electrode 72. The gate pad part is connected to the gate line 52. The data pad part is connected to the data line 58.

The thin film transistor 80 includes a gate electrode 54, a source electrode 60, a drain electrode 62, and a semiconductor pattern 147. The gate electrode 54 is connected to the gate line 52. The source electrode 60 is connected to the data line 58. The drain electrode 62 is connected to the pixel electrode 72. The semiconductor pattern 147 includes an active layer 92 overlapping the gate electrode 54, with the gate insulating pattern 90 positioned therebetween, and forming a channel region between the source electrode 60 and the drain electrode 62. The thin film transistor 80 responds to a gate signal supplied to the gate line 52 to allow charging of the pixel electrode 72 and to maintain a pixel voltage signal supplied to the data line 58.

As discussed above in reference to FIGS. 4 and 5, the semiconductor pattern 147 includes the active layer 92. The active layer 92 includes the channel portion between the source electrode 60 and the drain electrode 62. The active layer 92 is overlapped with the source electrode 60, the drain electrode 62, the data line 58 and a data pad (not shown). The active layer 92 is also overlapped with the storage electrode 66. Moreover, the active layer is formed to partially overlap the gate line 52 with the gate insulating pattern 90 positioned therebetween. The semiconductor pattern 147 further includes an ohmic contact layer 94 formed on the active layer 92 to establish an ohmic contact with the source electrode 60, the drain electrode 62, the storage electrode 66, the data line 58 and the data pad.

The pixel electrode 72 is connected to the drain electrode 62 and the storage electrode 66 of the thin film transistor 80 externally exposed by a passivation film pattern 98. The pixel electrode is formed within an area that excludes the passivation pattern 98 and the at least one protrusion 85. A charged pixel voltage causes a potential difference between the pixel electrode 72 and a common electrode formed on an upper substrate (not shown). Due to this potential difference, the liquid crystal material located between the thin film transistor substrate and the upper substrate rotates on account of a dielectric anisotropy. The rotated liquid crystal material transmits a light emitted by a light source (not shown) through the pixel electrode 72 to the upper substrate.

The at least one protrusion 85 includes the gate insulating pattern 90 and the passivation film pattern 98. The at least one protrusion 85 may include a first protrusion and a second protrusion facing each other in a diagonal direction in the pixel region. The at least one protrusion 85 may further include a third protrusion and a fourth protrusion facing each other in a direction crossing the first and the second protrusions. Meanwhile, in order to increase a height of the at least one protrusion 85, a semiconductor pattern and a source/drain pattern may be further formed between the gate insulating pattern 90 and the passivation pattern 98. Herein, the height of the at least one protrusion is in a range of 0.5 μm to 1.5 μm. The at least one protrusion 85 partitions the pixel region into a plurality of domains, hereinafter multi-domains.

More specifically, a protrusion region of an alignment film around the at least one protrusion 85 distorts an electric field applied to a liquid crystal material, thus orienting molecules of the liquid crystal material in various directions in a pixel region. In other words, when a voltage is applied to a liquid crystal display panel, a liquid crystal molecule located in a particular domain is oriented in a specific direction by the energy of the distorted electric field. The different domains of orientation form a plurality of multi-domains.

The storage capacitor 78 includes a pre-stage gate line 52 and the storage electrode 66. The storage electrode 66 is overlapped with a pre-stage gate line 52, with the gate insulating pattern 90, the active layer 92 and the ohmic contact layer 94 therebetween. The pixel electrode 72 is connected to the storage electrode 66 externally exposed by the passivation film pattern 98. The storage capacitor 78 is charged with the pixel voltage applied to the pixel electrode 72. The storage capacitor stabilizes the pixel voltage until a new pixel voltage is charged across the storage capacitor. The gate line 52 is connected to a gate driver (not shown) through the gate pad part (not shown). The data line 58 is connected to a data driver (not shown) through a data pad part (not shown).

In embodiments of the present invention, the thin film transistor array substrate having such an arrangement is manufactured through the use of a three mask process. The three mask process includes a first mask process for forming the gate patterns, a second mask process for forming the semiconductor pattern and the source/drain pattern, and a third mask process for forming the gate insulating pattern 90, the passivation film pattern 98, the transparent electrode pattern and the at least one protrusion 85.

Figure 6A:
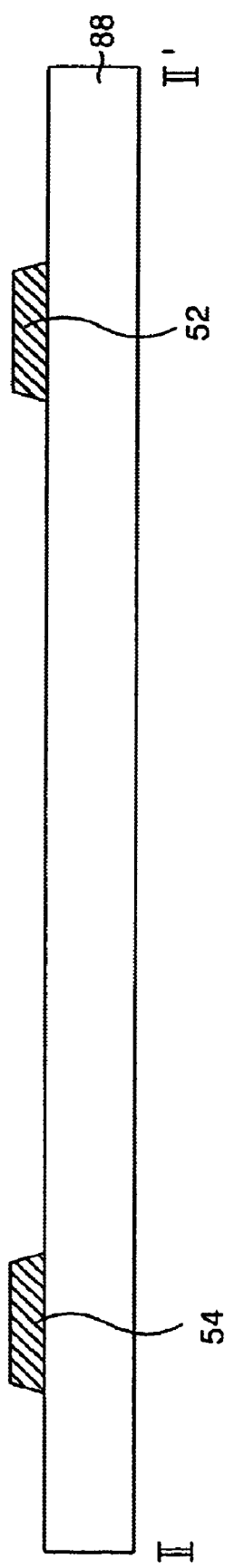
FIG. 6A is a sectional view of exemplary gate patterns formed by a method of manufacturing the thin film transistor array substrate according to an embodiment of the present invention.

FIG. 6A is a sectional view of exemplary gate patterns formed by a method of manufacturing the thin film transistor array substrate according to an embodiment of the present invention. Referring to FIG. 6A, gate metal layer is formed by a deposition method, such as sputtering, on the lower substrate 88. The gate metal layer may be Cr, MoW, Cr/Al, Cu, Al(Nd), Mo/Al, Mo/Al(Nd), Cr/Al(Nd) or the like in a type of a single layer or a double layer structure. Subsequently, the gate metal layer is patterned by a photolithography process, using the first mask and an etching process, to form the gate patterns including the gate line 52 and the gate electrode 54.

Figure 6B:
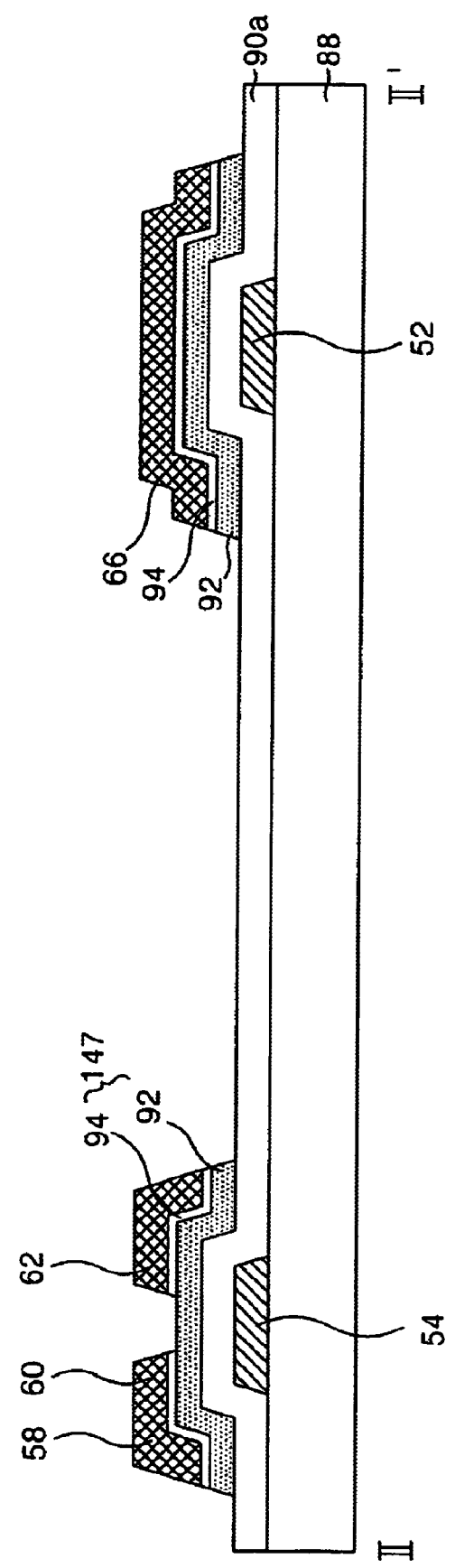
FIG. 6B is a sectional view of exemplary source/drain patterns formed by a method of manufacturing the thin film transistor array substrate according to an embodiment of the present invention.

FIG. 6B is a sectional view of exemplary source/drain patterns formed by a method of manufacturing the thin film transistor array substrate according to an embodiment of the present invention. Referring to FIG. 6B, a gate insulating layer 90a, an amorphous silicon layer, a n$^+$ amorphous silicon layer, and a source/drain metal layer are sequentially formed on the lower substrate 88 having the gate patterns. The gate insulating layer 90a is formed by a deposition technique, such as plasma enhanced chemical vapor deposition (PECVD) or sputtering. Herein, the gate insulating layer 90a is made of an inorganic insulating material, such as silicon oxide ($SiO_x$) or silicon nitride ($SiN_x$). The source/drain metal layer is made of molybdenum (Mo), Titanium (Ti), Tantalum (Ta), or molybdenum alloy.

A photo-resist pattern is formed thereafter by a photolithography process using the second mask. In this case, a diffractive exposure mask having a diffractive exposing part is used as a second mask. The diffractive exposing part corresponds to a channel portion of the thin film transistor. As a result, the height of a photo-resist pattern in the channel portion is lower than that of a photo-resist pattern in the source/drain portion.

Still referring to FIG. 6B, the source/drain metal layer is subsequently patterned by a wet etching process using the photo-resist pattern. The resulting source/drain patterns include the data line 58, the source electrode 60, the drain electrode 62 which is integral to the source electrode 60, and the storage electrode 66. Then, the amorphous silicon layer and the n$^+$ amorphous silicon layer are simultaneously patterned by a dry etching process using the same photo-resist pattern to thereby provide the ohmic contact layer 94 and the active layer 92. Moreover, the photo-resist pattern having a relatively low height in the channel portion is removed by an ashing process, for example.

The source/drain pattern and the ohmic contact layer 94 of the channel portion are thereafter etched by a dry etching process. Accordingly, as shown in FIG. 6B, the active layer 92 of the channel portion is exposed to separate the source electrode 60 from the drain electrode 62. A semiconductor pattern and a source/drain pattern may be further formed on the gate insulating film 90a to increase the height of the at least one protrusion 85 to be later made. Thereafter, a remainder of the photo-resist pattern left on the source/drain pattern part is removed using a stripping process, for example.

Figure 6C:
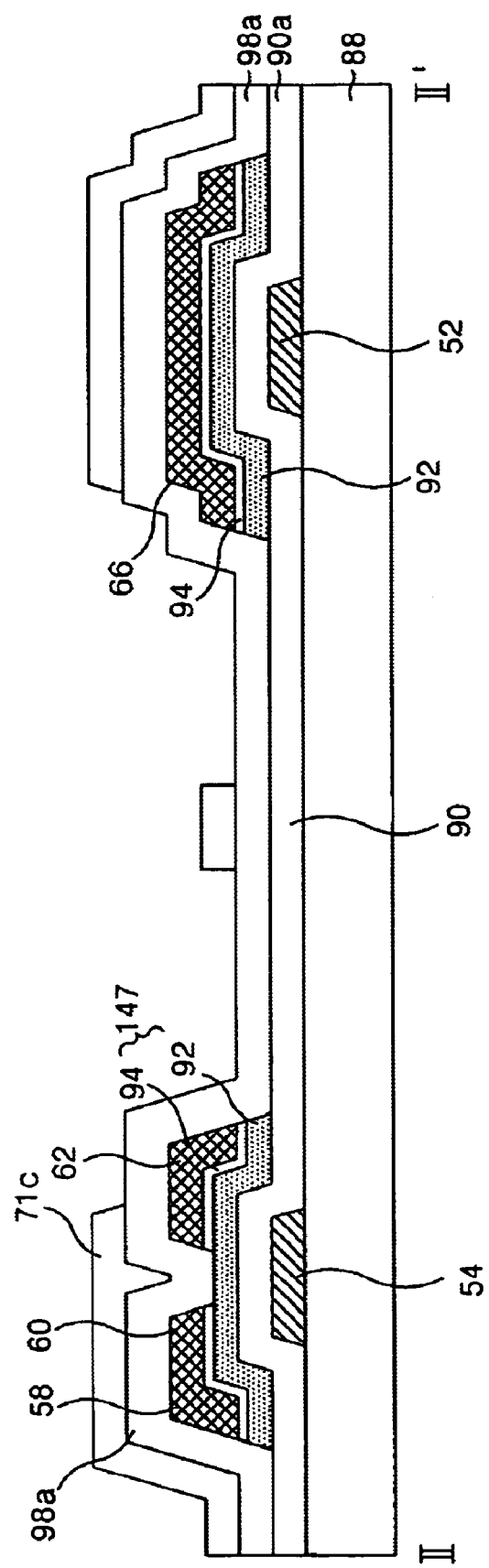
FIG. 6C is a sectional view of exemplary photo-resist patterns formed by a method of manufacturing the thin film transistor array substrate according to an embodiment of the present invention.

FIG. 6C is a sectional view of exemplary photo-resist patterns formed by a method of manufacturing the thin film transistor array substrate according to an embodiment of the present invention. Referring to FIG. 6C, a passivation film 98a is deposited by a deposition technique, such as sputtering, on the gate insulating film 90a having the source/drain patterns. The passivation film 98a can be made of an inorganic insulating material, such as silicon oxide ($SiO_x$) or silicon nitride ($SiN_x$). Alternatively, the passivation film can be made of an organic insulating material having a small dielectric constant, such as an acrylic organic compound, BCB (benzocyclobutene) or PFCB (perfluorocyclobutane). A photo-resist is provided over the entire passivation film 98a. Subsequently, a photo-resist pattern 71c is formed by a photolithography process, for example, using the third mask, as shown in FIG. 6C.

The passivation film 98a and the gate insulating film 90 are subsequently patterned by a dry-etching process, for example, using the photo-resist pattern 71c as a mask to form a passivation film pattern 98 and the gate insulating pattern 90 at remaining areas excluding areas having a transparent electrode pattern within. A protrusion is also formed. The protrusion includes the gate insulating pattern 90 and the passivation film pattern 98. Herein, a total height of the protrusion is in a range of 0.5 μm to 1.5 μm.

Figure 6D:
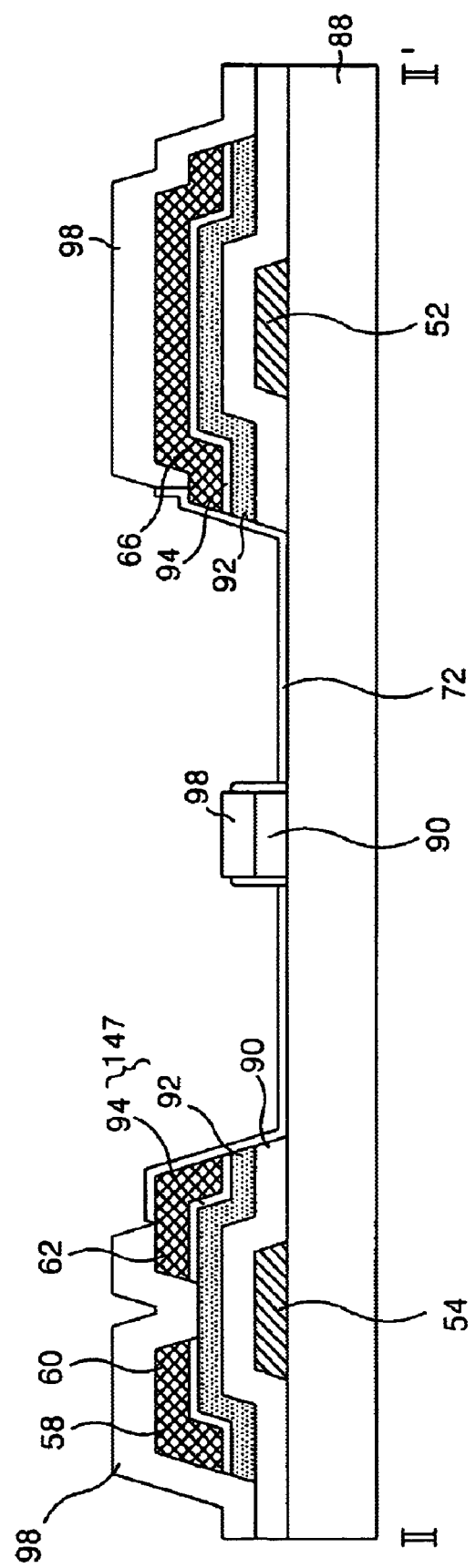
FIG. 6D is a sectional view of exemplary transparent electrode patterns formed by a method of manufacturing the thin film transistor array substrate according to an embodiment of the present invention.

FIG. 6D is a sectional view of exemplary transparent electrode patterns formed by a method of manufacturing the thin film transistor array substrate according to an embodiment of the present invention. Referring to FIG. 6D, a transparent electrode material 74a is thereafter deposited on the entire thin film transistor array substrate 88 having the photo-resist pattern 71c thereon. The transparent electrode is deposited by a deposition technique, such as sputtering. The transparent electrode material is made of an indium-tin-oxide (ITO), a tin-oxide (TO), or an indium-zinc-oxide (IZO). The photo-resist pattern 71c is removed from the thin film transistor array substrate 88 having the transparent electrode material deposited thereon by a stripping process using a lift-off method. The transparent electrode material deposited on the photo-resist pattern 71c is removed together with the photo-resist pattern 71c to form a transparent pattern including the pixel electrode 72.

FIG. 7 is a diagram depicting a formation of exemplary multi-domains of alignments of liquid crystal molecules in the thin film transistor array substrate according to an embodiment of the present invention. As described above, the alignment film 99 is provided to the thin film transistor array substrate formed by the three mask process. A color filter array substrate is combined with the thin film transistor array substrate. Then, a liquid crystal material 100 is injected between the thin film transistor array substrate and the color filter. Thereby, the multi-domains having different alignments of the liquid crystal molecules are formed in one liquid crystal cell, as shown in FIG. 7.

As set forth above, the method of manufacturing the thin film transistor array substrate according to embodiments of the present invention simplifies the configuration of the substrate and the manufacturing process thereof by using the three mask process in conjunction with the lift-off method. Accordingly, manufacturing costs are further decreased and manufacturing yield is further increased. Further, in accordance with embodiments of the present invention, the liquid crystal display panel has an improved viewing angle, because of the multi-domains generated by the one or more protrusion formed within the pixel region.

Figure 8A:
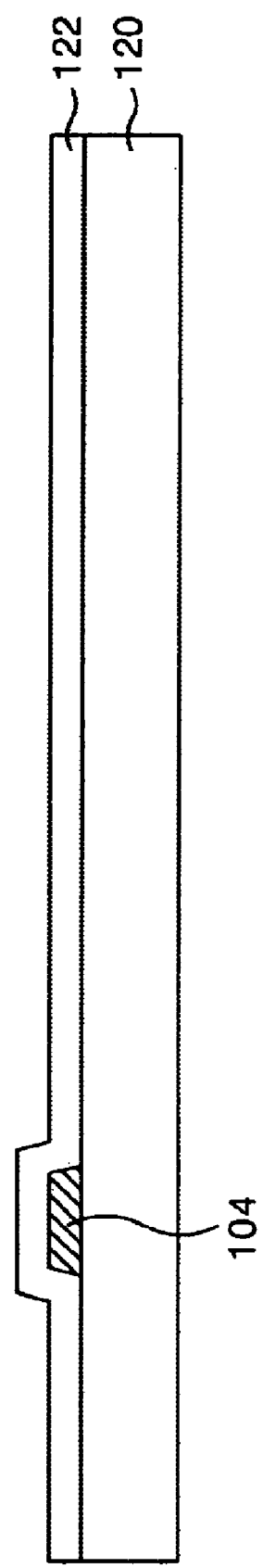
FIG. 8A is a sectional view illustrating the formation of an exemplary insulated gate electrode by a method of manufacturing a liquid crystal display panel with a vertical alignment mode according to another embodiment of the present invention.

FIG. 8A is a sectional view illustrating the formation of an exemplary insulated gate electrode by a method of manufacturing a liquid crystal display panel with a vertical alignment mode according to another embodiment of the present invention. As shown in FIG. 8A, a gate electrode 104 is formed on a first substrate 120, made of a transparent insulating material, such as a glass, and including a thin film transistor region and a pixel region. The gate electrode 104 is formed by covering the first substrate 120 with a metal, such as aluminum (Al), aluminum (Al) alloy, or copper (Cu), using a deposition method, such as sputtering. Then, photolithography is performed using a photo-resist and a mask. Thereafter, a gate insulating layer 122 is formed on the first substrate 120 including the formed gate electrode 104. The gate insulating layer 122 includes an insulating material, such as a silicon nitride (SiNx) or a silicon oxide (SiO$_2$). The gate insulating layer 122 is deposited by a chemical vapor deposition (CVD) method.

The gate electrode 104 may include a single layer of metal. Alternatively, the gate electrode 104 may include a double layer of metals, such as aluminum/chrome (Al/Cr). In this case, the aluminum Al layer and the chrome Cr layer are sequentially stacked. Then, the gate electrode is formed using a photo process. A gate line (not shown) is concurrently formed with the gate electrode 104A.

Figure 8B:
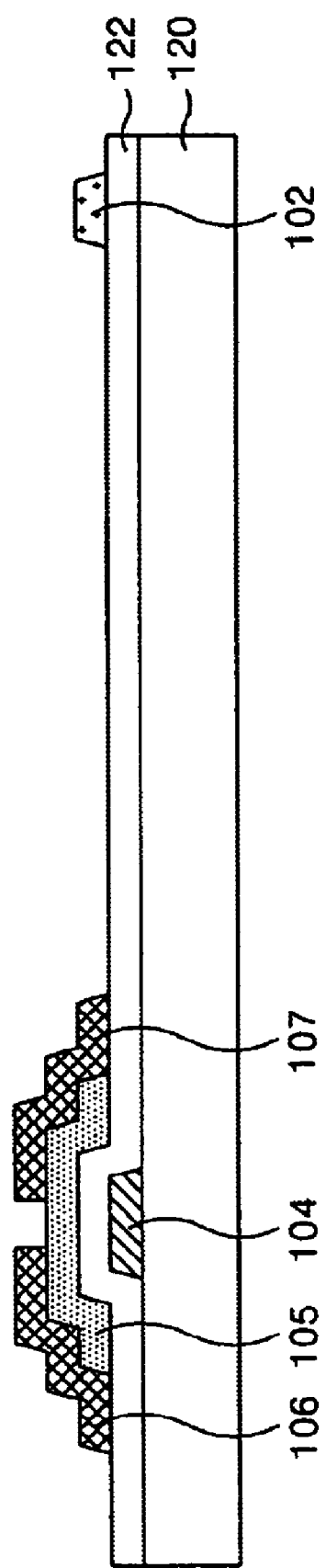
FIG. 8B is a sectional view illustrating the formation of exemplary source, drain and data electrode patterns by a method of manufacturing a liquid crystal display panel with a vertical alignment mode according to another embodiment of the present invention.

FIG. 8B is a sectional view illustrating the formation of exemplary source, drain and data electrode patterns by a method of manufacturing a liquid crystal display panel with a vertical alignment mode according to another embodiment of the present invention. Referring to FIG. 8B, a semiconductor, such as Si, is stacked on the gate insulating layer 122. The semiconductor is then etched to form a semiconductor layer 105. A source electrode 106 and a drain electrode 107 are thereafter formed on the semiconductor layer 105. A data electrode 102 is concurrently formed on the gate insulating layer 122.

In an embodiment of the present invention, the semiconductor layer 105 is formed by applying a Si layer by a CVD method, and thereafter etching the provided Si layer. The source electrode 106 and the drain electrode 107 are formed by stacking a metal in a single layer or a double layer using a deposition method, such as sputtering, and then etching the metal. The metal used for the source electrode 106 and the drain electrode 107 can be aluminum (Al), an aluminum (Al) alloy, copper (Cu), molybdenum (Mo), or chrome (Cr), for example. The semiconductor layer 105, the source electrode 106, the drain electrode 107 and the data electrode 102 can be concurrently formed by sequentially stacking a semiconductor and a source electrode material and then patterning them using one mask.

Figure 8C:
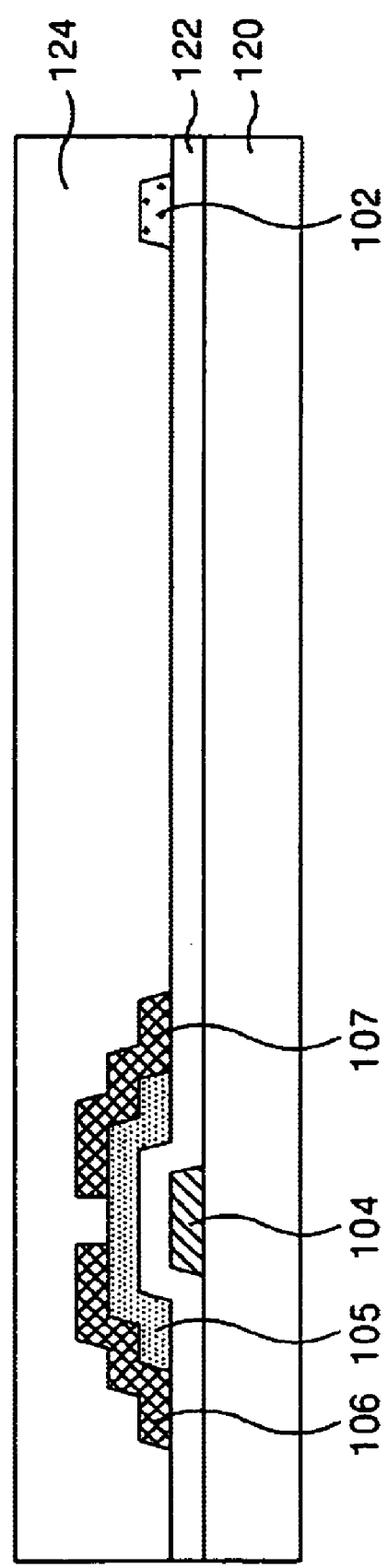
FIG. 8C is a sectional view illustrating the formation of an exemplary passivation film by a method of manufacturing a liquid crystal display panel with a vertical alignment mode according to another embodiment of the present invention.

FIG. 8C is a sectional view illustrating the formation of an exemplary passivation film by a method of manufacturing a liquid crystal display panel with a vertical alignment mode according to another embodiment of the present invention. Referring to FIG. 8C, an organic material, such as a BCB (benzocyclobutene) or a photo acryl, is subsequently stacked on the first substrate 120, to form a passivation film 124. In further described embodiments of the present invention, the passivation film 124 may have a double-layer structure including an inorganic passivation layer and an organic passivation layer.

Figure 8D:
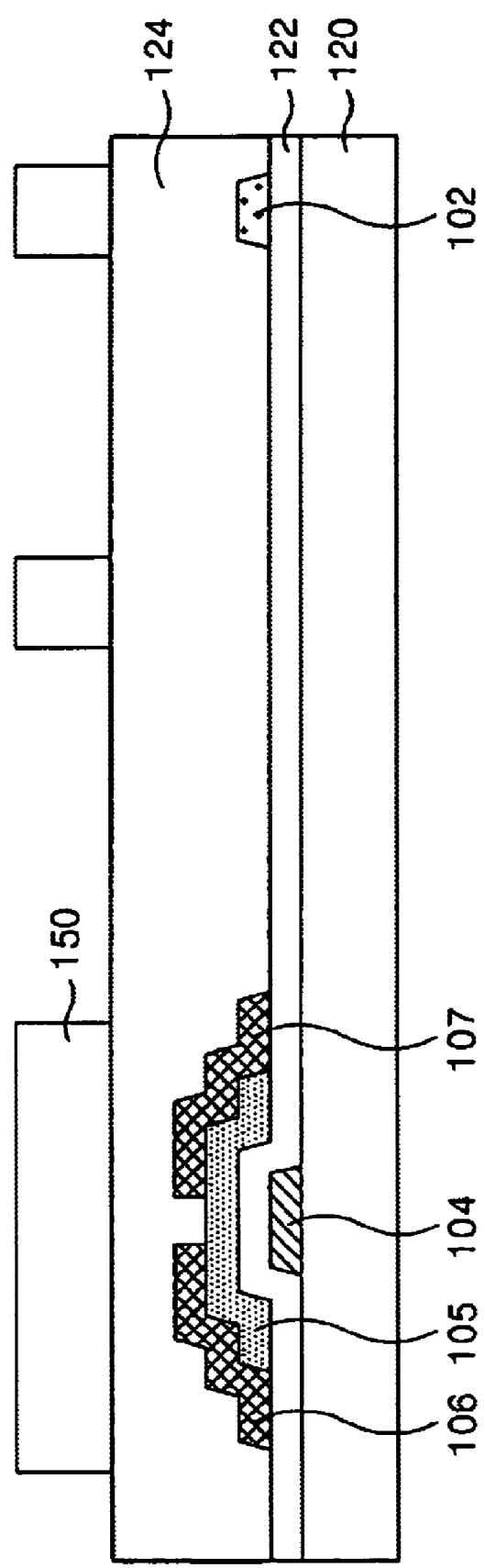
FIG. 8D is a sectional view illustrating the formation of an exemplary photo-resist pattern by a method of manufacturing a liquid crystal display panel with a vertical alignment mode according to another embodiment of the present invention.

FIG. 8D is a sectional view illustrating the formation of an exemplary photo-resist pattern by a method of manufacturing a liquid crystal display panel with a vertical alignment mode according to another embodiment of the present invention. Referring to FIG. 8D, a photo-resist is provided on the passivation film 124. The photo-resist is irradiated by ultraviolet rays and is developed while blocking a partial region of the passivation film 124 with a mask, to form a photo-resist pattern 150 on the passivation film 124. The photo-resist pattern 150 is formed on an upper portion of the thin film transistor region, the pixel region and the data electrode 102. Thus, the photo-resist pattern covers a portion of the passivation film 124, while another portion of the passivation film 124 is uncovered by the photo-resist pattern 150.

FIG. 8E is a sectional view illustrating the formation of an exemplary pixel electrode pattern by a method of manufacturing a liquid crystal display panel with a vertical alignment mode according to another embodiment of the present invention. Referring to FIG. 8E, the passivation film 124 is etched in accordance with the photo-resist pattern 150 to remove the uncovered portion of the passivation film 124. The removal of the uncovered portion of the passivation film 124 exposes a portion of the gate insulating layer 122 in the pixel region. A portion of the drain electrode 107 of the thin film transistor region is also exposed. A transparent conductive material, such as an indium-tin-oxide (ITO) or an indium-zinc-oxide (IZO), is provided by a deposition technique such as sputtering. Thus, a pixel electrode 110 is formed on upper portions of the photo-resist pattern, and the exposed portions of the gate insulating layer 122 and the drain electrode 107.

FIG. 8F is a sectional view illustrating the formation of exemplary upper layers of a liquid crystal display panel using a vertical alignment mode according to another embodiment of the present invention. Referring to FIG. 8F, a lift-off of the photo-resist pattern 150 is subsequently performed. In the resulting structure, the passivation film 124 covers the upper portion of the thin film transistor region and the data electrode 102. A protrusion 139 having a designated width is also formed at the pixel region. The protrusion 139 distorts electric fields across the VA mode liquid crystal display panel. The distorted electric fields are symmetric in regions adjacent to the protrusion 139.

In embodiments of the present invention, the protrusion 139 is made of an organic material, such as BCB (benzocyclobutene) or a photo acryl. A preferred height of the protrusion 139 is about 1 μm to 4 μm above the pixel electrode 110. If the passivation film 124 includes an inorganic layer and an organic layer, it is preferable that the protrusion 139 be also formed with a double layer including the inorganic layer and the organic layer.

Still referring to FIG. 8F, a black matrix layer 132 and R, G, B color filter layers 134 are formed on a second substrate 130. The black matrix 132 is made of a chrome/chrome oxide Cr/CrOx, for example. A transparent conductive material, such as ITO or IZO, is subsequently stacked on the color filter layer 134 to form a common electrode 138. An overcoat layer (not shown) or a passivation film (not shown) may be formed on the color filter layer 134 to protect and flatten the color filter layer.

The resulting second substrate 130 is joined to the first substrate 120 by a sealant. A liquid crystal material having a negative dielectric anisotropy is injected between the second substrate 130 and the first substrate 120 to form a liquid crystal layer 140. Alternatively, the liquid crystal layer may be formed on the first substrate 120 or the second substrate 130 prior to the joining of the substrates.

As described above, in accordance with an embodiment of the present invention, the passivation film 124 is etched to expose the drain electrode. Then, remaining portions of electrode excluding the pixel electrode 10 formed on a portion of the gate insulating layer 122 and the drain electrode 107 are removed by the lift-off process. Thus, a mask is not required for the pixel electrode. Also, since the protrusion 139 is concurrently formed with the passivation film 124, a mask for the protrusion 139 is not required. Accordingly, the present method of manufacturing the liquid crystal display panel with the VA mode using the lift-off method simplifies manufacturing process by enabling the formation of the pixel electrode and the protrusion without the need for a separate mask.

FIG. 8G is a sectional view illustrating a distortion of a electric field around a protrusion in an exemplary liquid crystal display panel with a vertical alignment mode according to another embodiment of the present invention. Referring to FIG. 8G, in embodiments of the present invention, the protrusion 139 is formed with the same material as the passivation layer 124 within the pixel region of the first substrate 120. As set forth above, the protrusion 139 distorts an electric field E between the pixel electrode 110 and the common electrode 138. The distorted electric field E is symmetric around the protrusion 139. Accordingly, liquid crystal molecules aligned along the electric field E are also symmetrically aligned with respect to the protrusion 139, thereby forming two domains having different alignment directions around the protrusion 139. Moreover, although only one protrusion 139 forming two domains is depicted in FIG. 8G, it is possible to form three or more domains by forming a plurality of the protrusions 139 on the first substrate 120.

Figure 9A:
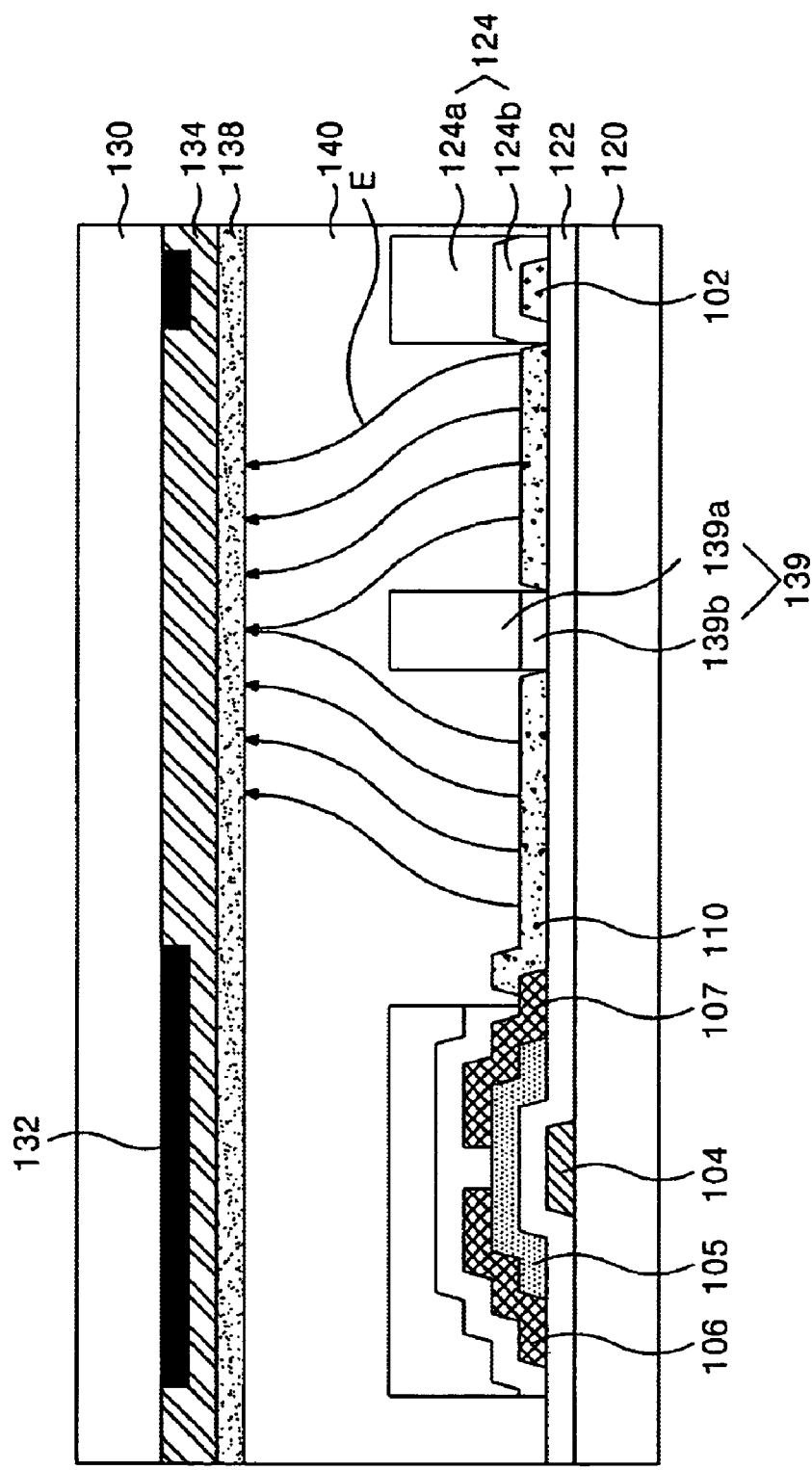
FIG. 9A is a sectional view of an exemplary liquid crystal display panel with a vertical alignment mode having a double-layered protrusion according to yet another embodiment the present invention.

FIG. 9A is a sectional view of an exemplary liquid crystal display panel with a vertical alignment mode having a double-layered protrusion according to yet another embodiment the present invention. Referring to FIG. 9A and as set forth above, the passivation film 124 may have a double-layer structure including an inorganic passivation layer 124b and an organic passivation layer 124a. The inorganic passivation layer 124b may include an inorganic insulating material identical to that of the gate insulating film. For example, the inorganic layer may include silicon oxide ($SiO_x$) or silicon nitride ($SiN_x$). The organic passivation layer 124a may include an organic insulating material.

Still referring to FIG. 9A, the protrusion 139 is formed with a double layer structure including a first insulating pattern 139b and a second insulating pattern 139a. The second insulating pattern 139a includes the same material as the inorganic passivation layer 124b. The first insulating pattern 139b includes the same material as the organic passivation layer 124a. Higher number of layers may be possible in alternate embodiments if the present invention.

Figure 9B:
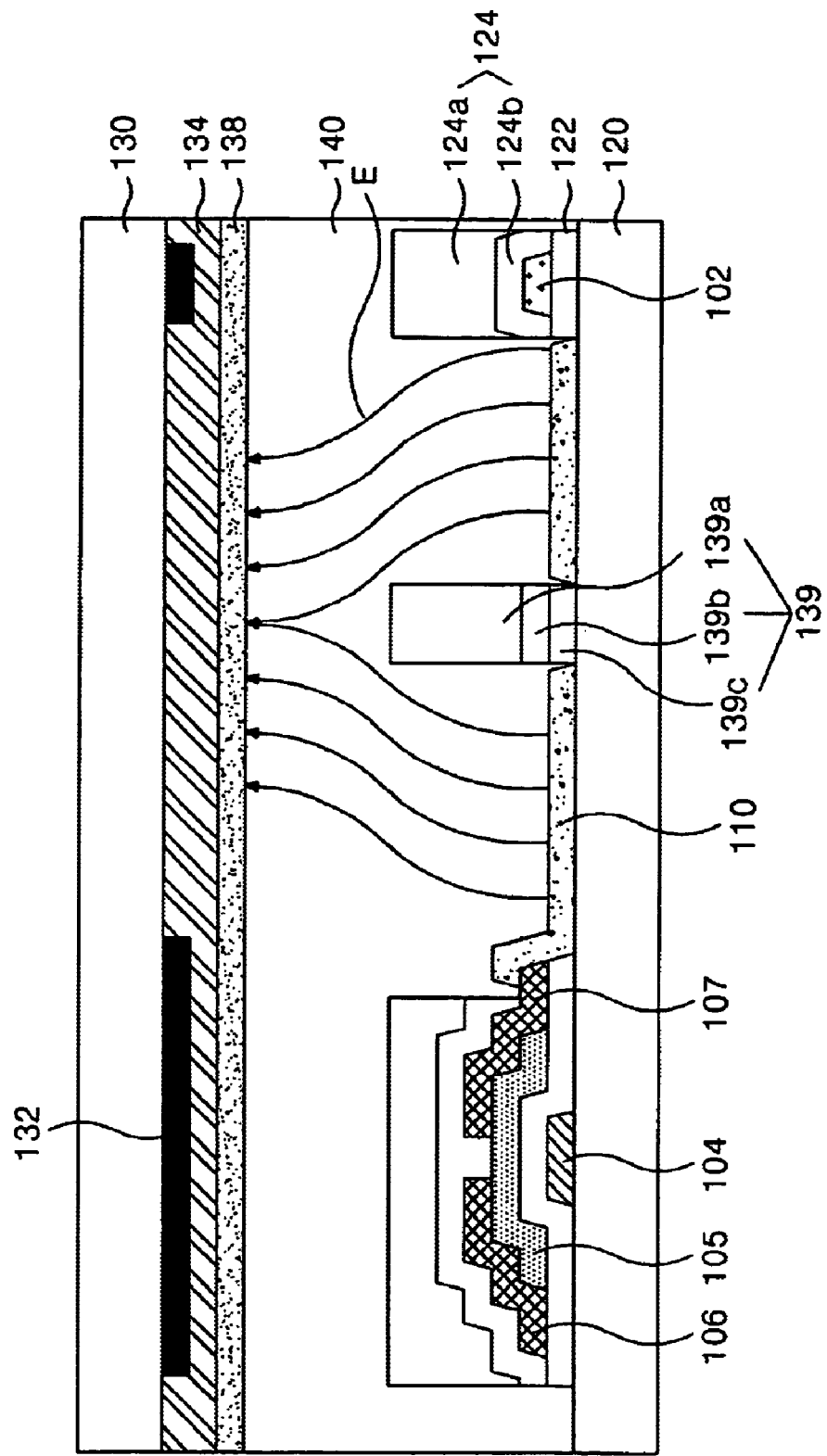
FIG. 9B is a sectional view of an exemplary liquid crystal display panel with a vertical alignment mode having a triple-layered protrusion according to yet another embodiment the present invention.

FIG. 9B is a sectional view of an exemplary liquid crystal display panel with a vertical alignment mode having a triple-layered protrusion according to yet another embodiment the present invention. As shown in FIG. 9B, the protrusion 139 is formed with a triple layer having a first insulating pattern 139c, a second insulating pattern 139b and a third insulating pattern 139a. The first insulting pattern 139c includes the same material as the gate insulating film 122.

Figure 10:
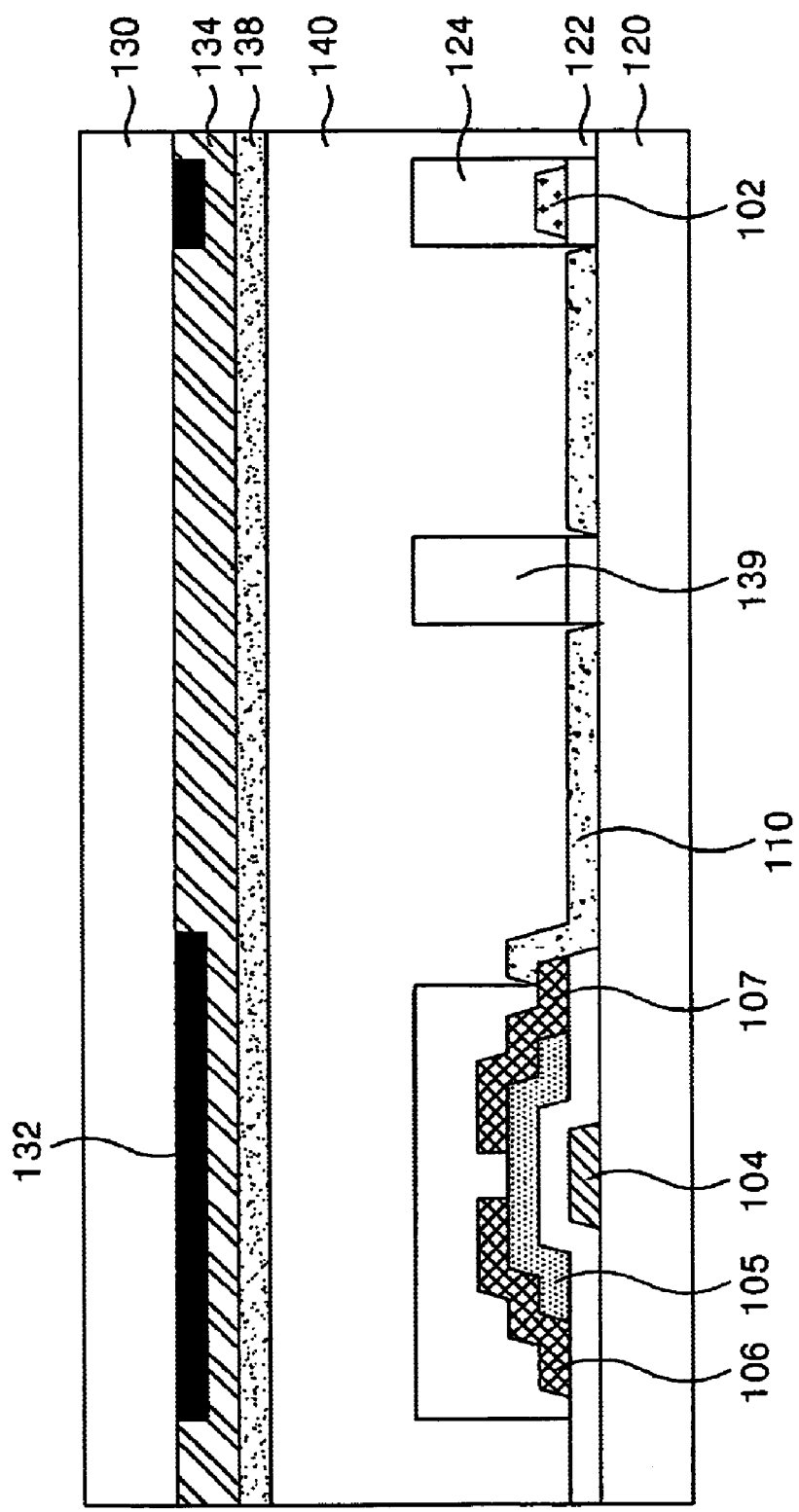
FIG. 10 is sectional view illustrating another exemplary configuration of a liquid crystal display panel with a vertical alignment mode according to still another embodiment the present invention.

FIG. 10 is sectional view illustrating another exemplary configuration of a liquid crystal display panel with a vertical alignment mode according to still another embodiment the present invention. Referring to FIG. 10, the pixel electrode 110 may be formed on the first substrate 120, but excluding the gate insulating layer 122. In this case, the passivation film 124 and the gate insulating layer 122 are etched by the photo-resist pattern 150 to form the pixel electrode 110 on the substrate 120. Then, the pixel electrode 110 is formed on a portion of the drain electrode 107 to supply a signal provided via the thin film transistor to the pixel electrode 110. Moreover, the protrusion 139 may be formed by etching the gate insulating layer 122 and the passivation 124. In this case, the protrusion 139 is made of a material identical to that of the gate insulating layer 122 and the passivation film 124.

Figure 11A:
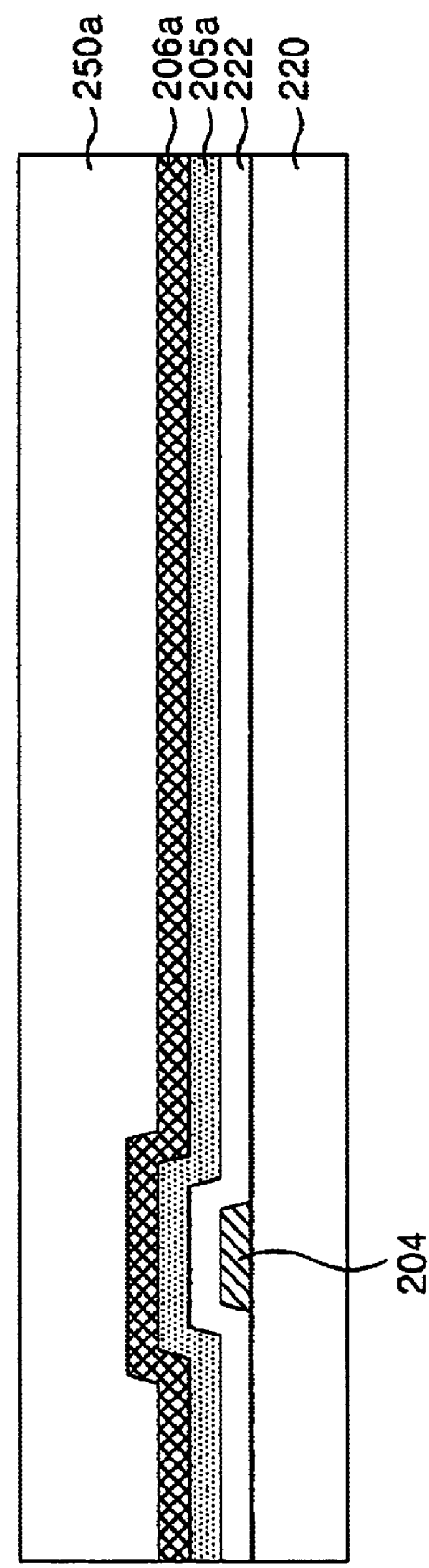
FIG. 11A is a sectional view illustrating the formation of a thin film transistor region over an insulated gate electrode by a method of manufacturing a liquid crystal display panel with a vertical alignment mode according to another embodiment of the present invention.

FIG. 11A is a sectional view illustrating the formation of a thin film transistor region over an insulated gate electrode by a method of manufacturing a liquid crystal display panel with a vertical alignment mode according to another embodiment of the present invention. Referring to FIG. 11A, a gate electrode 204 is formed on a first substrate 220 including a thin film transistor region and a pixel region. The gate electrode 204 may include a single layer or a multi-layer structure consisting of aluminum (Al), aluminum alloy, copper (Cu) or chrome (Cr), for example. Thereafter, a gate insulating layer 222, a semiconductor 205a and a metal layer 206a are sequentially stacked on an entire surface of the first substrate 220. Subsequently, a photo-resist 250a is provided to cover the metal layer 206a.

Figure 11B:
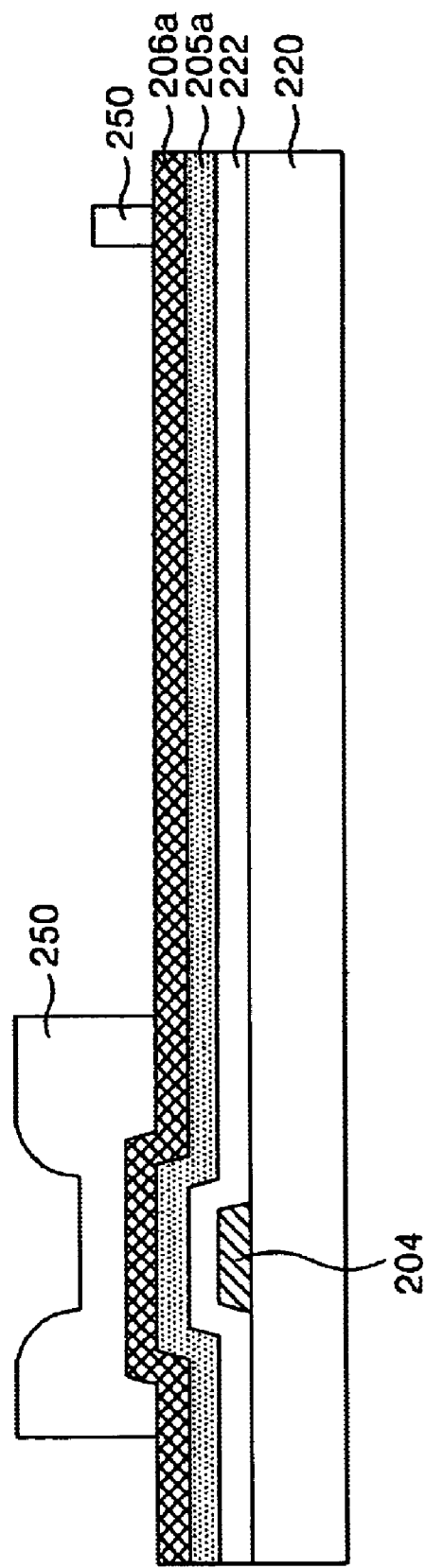
FIG. 11B is a sectional view illustrating the formation of a photo-resist pattern by a method of manufacturing a liquid crystal display panel with a vertical alignment mode according to another embodiment of the present invention.

FIG. 11B is a sectional view illustrating the formation of a photo-resist pattern by a method of manufacturing a liquid crystal display panel with a vertical alignment mode according to another embodiment of the present invention. As shown in FIG. 11B, a portion of the photo-resist is removed within the pixel region. Thus, a photo-resist pattern 250 is formed in the thin film transistor region. An intensity of the light irradiated onto the thin film transistor region changes due to a slit formed in the diffractive mask. Accordingly, a portion of the photo-resist on the gate electrode 204 is removed on the gate electrode 204, while a remaining portion of the photo-resist is left on both edges of the gate electrode 204. The resulting photo-resist pattern 250 has a different thickness in different regions.

FIG. 11C is a sectional view illustrating the formation of a metal pattern by a method of manufacturing a liquid crystal display panel with a vertical alignment mode according to another embodiment of the present invention. As shown in FIG. 11C, a semiconductor layer 205 and a metal pattern 206*b* are formed by sequentially etching the metal layer 206*a* and the semiconductor 205*a* excluding the portion of the metal layer 206*a* that is covered by the photo-resist pattern 250 on both edges of the gate electrode 204. A data line 202*b* is also formed. A semiconductor layer 202*a* remains beneath the data line 202*b*. A thin portion of the photo-resist on the gate electrode 204 is removed in an ashing process, while the thick portion photo-resist on both edges of the gate electrode 204 is only partially removed.

FIG. 11D is a sectional view illustrating the formation of a source electrode and a drain electrode by a method of manufacturing a liquid crystal display panel with a vertical alignment mode according to another embodiment of the present invention. As shown in FIG. 11D, the metal pattern 206*b* is subsequently etched using the remaining photo-resist pattern 250 as a mask. Then, the remaining photo-resist pattern 250 is removed to form a source electrode 206 and a drain electrode 207 on the semiconductor layer 205. Thereafter, a passivation film 224 is formed by stacking an organic material or an inorganic material on the first substrate 220. The organic material may be a BCB (benzocyclobutene) or a photo acryl, for example. A photo-resist pattern 252 if formed by stacking and developing a photo-resist on the passivation film 224. The photo-resist pattern 252 is formed on the thin film transistor region, the pixel region, and the data line 202*b*.

Figure 11E:
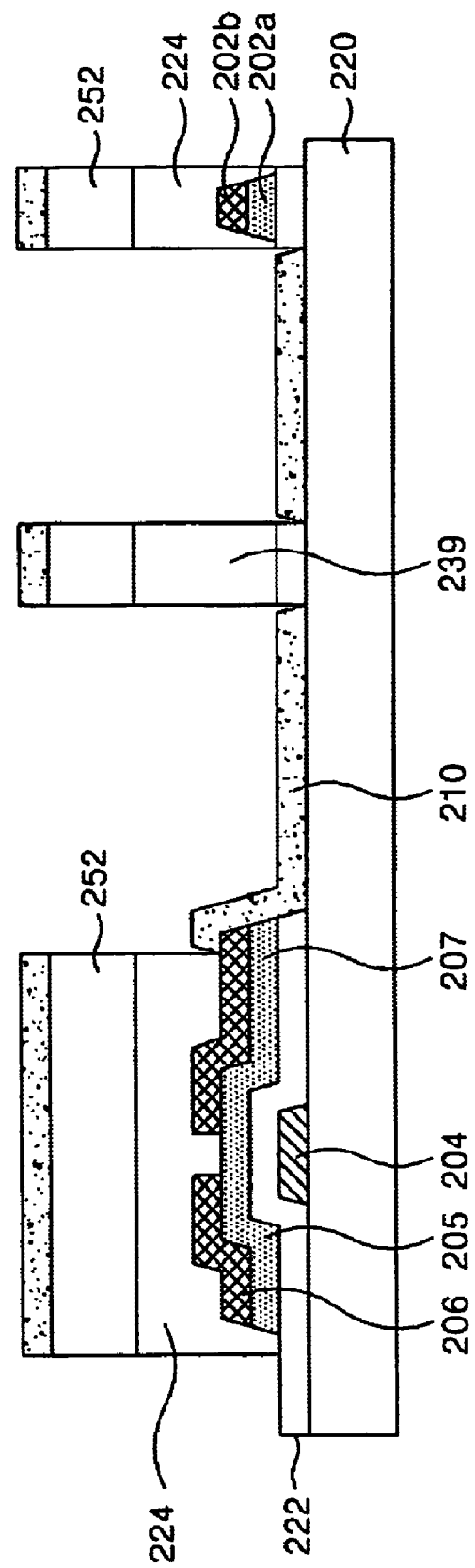
FIG. 11E is a sectional view illustrating the formation of an exemplary pixel electrode by a method of manufacturing a liquid crystal display panel with a vertical alignment mode according to another embodiment of the present invention.

FIG. 11E is a sectional view illustrating the formation of an exemplary pixel electrode by a method of manufacturing a liquid crystal display panel with a vertical alignment mode according to another embodiment of the present invention. As shown in FIG. 11E, the gate insulating layer 222 and the passivation film 224 are etched to remove a portion of the gate insulating layer 222 and a portion of the passivation film 224. In this etching process, the photo-resist pattern 252 is used as a mask to protect covered portions of the passivation film 224. The etching process exposes a portion of the first substrate 220 of the pixel region and a portion of the drain electrode in the thin film transistor region. A transparent conductive material, such as indium-tin-oxide (ITO) or indium-zinc-oxide (IZO), is subsequently deposited on the entire substrate 220 including exposed surfaces of the photo-resist pattern 252, the pixel region of the first substrate 220 and the exposed portion of drain electrode, to form the pixel electrode 210. The transparent conductive material is deposited by a deposition technique, such as sputtering.

Figure 11F:
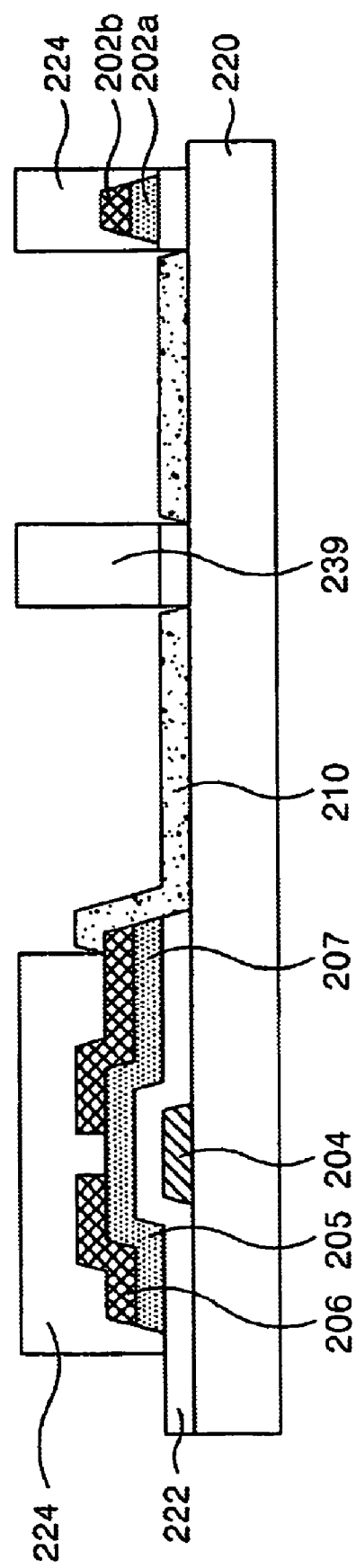
FIG. 11F is a sectional view illustrating the formation of an exemplary double layered protrusion in a pixel region by a method of manufacturing a liquid crystal display panel with a vertical alignment mode according to another embodiment of the present invention.

FIG. 11F is a sectional view illustrating the formation of an exemplary double layered protrusion in a pixel region by a method of manufacturing a liquid crystal display panel with a vertical alignment mode according to another embodiment of the present invention. Referring to FIG. 11F, the passivation film 224 is formed on the surfaces of the thin film transistor region and the data line 202*b* by lifting-off the photo-resist pattern 252. A protrusion 239 with a specified width is also formed within the pixel region. In this embodiment of the present invention, the protrusion 239 has a double-layered structure, made by etching the gate insulating layer 222 and the passivation film 224.

Figure 11G:
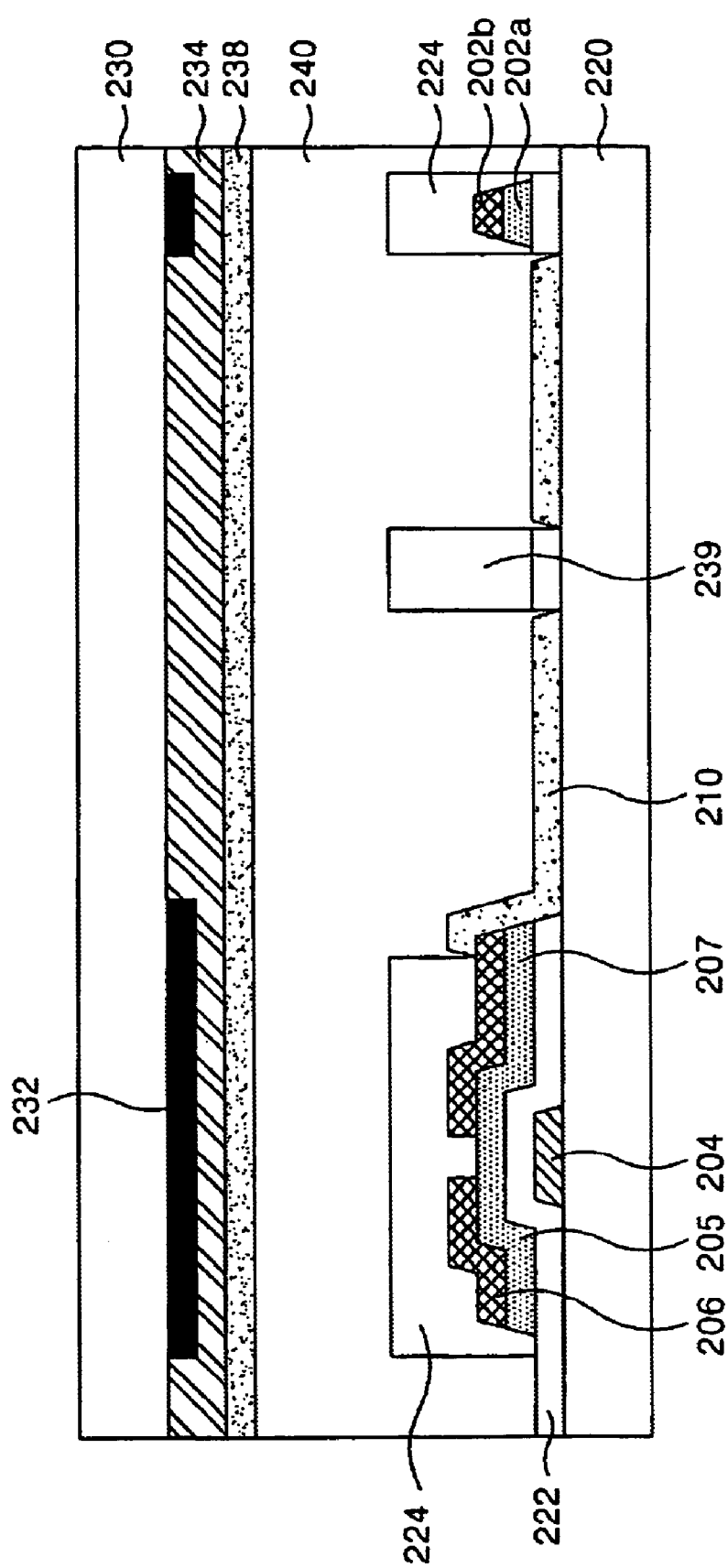
FIG. 11G is a sectional view illustrating the formation of exemplary upper layers of a liquid crystal display panel using a vertical alignment mode according to another embodiment of the present invention.

FIG. 11G is a sectional view illustrating the formation of exemplary upper layers of a liquid crystal display panel using a vertical alignment mode according to another embodiment of the present invention. Referring to FIG. 11G, a black matrix 232 and R, G, B color filter layers 234 are formed on a second substrate 230. A transparent conductive material, such as ITO or IZO, is subsequently stacked on the color filter layers 234 to form a common electrode 238. Thereafter, the second substrate 230, including the black matrix layer, the R, G, B color filter layer, and the transparent conductive material, is joined to the first substrate 220 by a sealant. Then, a liquid crystal layer is filled between the first substrate 220 and the second substrate 230, to thereby complete the liquid crystal display panel with the VA mode.

In embodiments of the present invention, as described above, a three mask process is used to manufacture the liquid crystal display panel with the VA mode: a first mask for the gate electrode, a second mask for the semiconductor layer 205 and the source/drain electrode 206 and 207, and a third mask for the organic passivation film pattern 224. Accordingly, embodiments of the present invention reduce the number of masks to three compared with the related art methods of manufacturing the liquid crystal display panel.

In accordance with embodiments of the present invention, the liquid crystal display panel with the VA mode depicted in FIG. 11G has a similar structure to the liquid crystal display panel with the VA mode depicted in FIG. 10. The pixel region is divided, by at least one protrusion formed within the pixel region, into a plurality of domains having symmetric electric fields. This configuration improves the viewing angle of the liquid crystal display panel.

Alternatively, the liquid crystal display panel with the VA mode according to the present embodiment may be given the structure shown in FIG. 8G. Specifically, the liquid crystal display panel with the VA mode may be structured so that the pixel electrode 210 is formed on the gate insulating layer 222 within the pixel region. In this case, the liquid crystal display panel depicted in FIG. 8G is formed by the process similar to the embodiments depicted in FIG. 10A to 10G, except that a passivation film is etched by the photo-resist pattern 252 shown in FIG. 11D.

Figure 12:
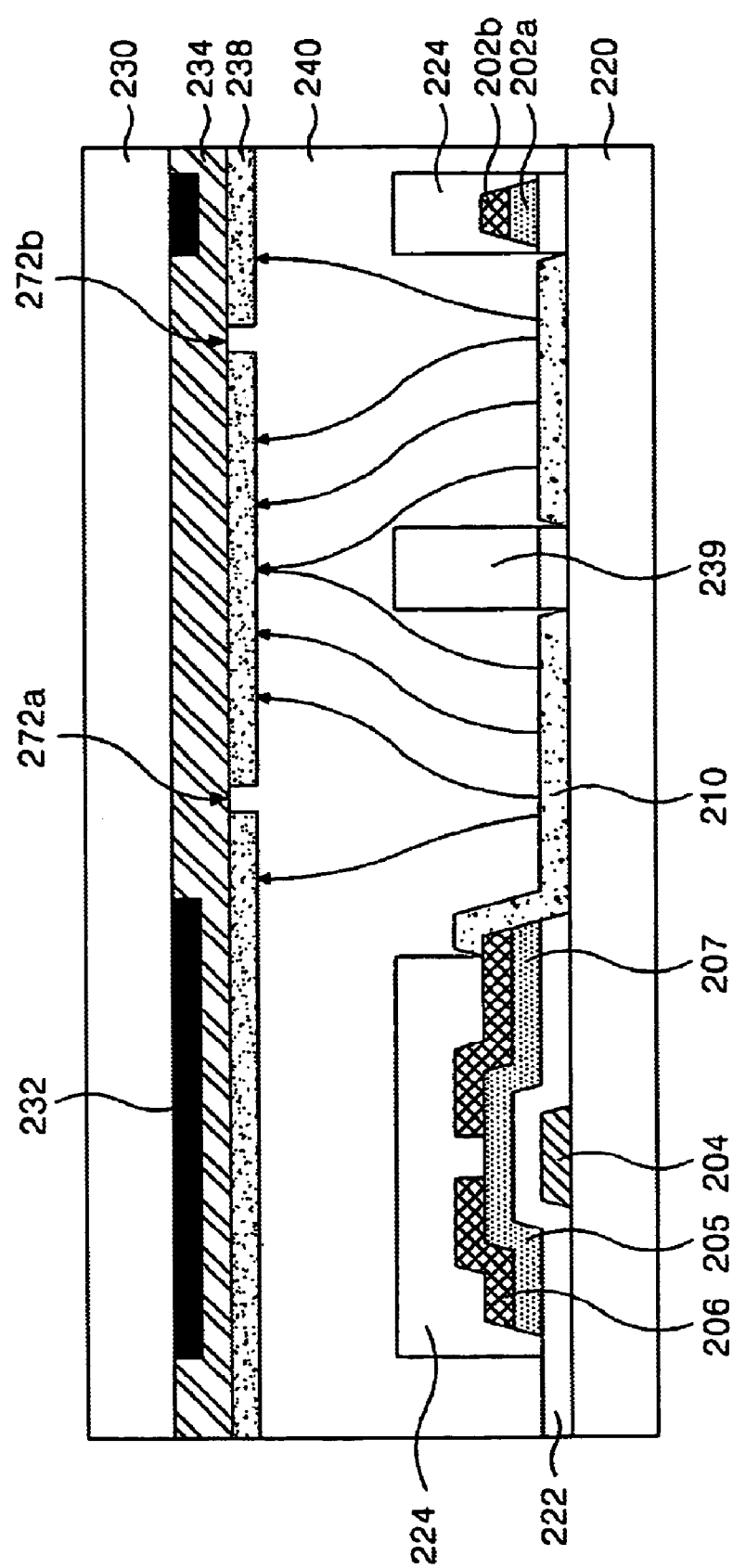
FIG. 12 is a sectional view illustrating another exemplary structure of a liquid crystal display panel with the vertical alignment mode according to another embodiment of the present invention.

FIG. 12 is a sectional view illustrating another exemplary structure of a liquid crystal display panel with the vertical alignment mode according to another embodiment of the present invention. Referring to FIG. 12, in the liquid crystal display panel with the VA mode, the protrusion 239 including a portion of the passivation film 224 or the gate insulating layer/passivation film 222/224 is formed on the first substrate 220. In addition, slits 272*a* and 272*b* are made on the second substrate by removing portions of the common electrode 238.

Similarly to the protrusion 239, the slits 272*a* and 272*b* distort the electric field within the pixel region to improve the viewing angle of the liquid crystal display panel. The slits 272*a* and 272*b* are made by forming the common electrode 238 and subsequently etching portions of the common electrode 238 by a photo process. Accordingly, the liquid crystal display panel with the VA mode having the above-described configuration requires an additional mask for making the slit, which results in a five mask process or a four mask process.

Each of the protrusion 239 and the slits, 272*a* and 272*b*, divides the pixel region into a plurality of domains. However, the protrusion 239 and the slits, 272*a* and 272*b*, do not face each other. As shown in FIG. 12, four domains are formed by one protrusion 239 and two slits 272*a* and 272*b*. Although the number of protrusions and slits may be changed, at least one or more is sufficient for forming a necessary number of domains in the pixel region.

In accordance with embodiments of the present invention, in a thin film transistor array substrate, a liquid crystal display panel including the same, and a method of manufacturing the thin film transistor array substrate and the liquid crystal display panel, a plurality of protrusions is formed within the pixel region using a lift-off method to form a multi-domain. Thus, a configuration of a substrate and a manufacturing process thereof are simplified, manufacturing costs are thus reduced and the viewing angle of the liquid crystal display panel is improved.

It will be apparent to those skilled in the art that various modifications and variations can be made in the thin film transistor array substrate, the liquid crystal display panel having the same, and the method of manufacturing the thin film transistor array substrate and the liquid crystal display panel, of the present invention, without departing from the spirit or scope of the invention. Thus, it is intended that the present invention cover the modifications and variations of this invention provided they come within the scope of the appended claims and their equivalents.

What is claimed is:

1. A method of manufacturing a thin film transistor array substrate, comprising:
    forming a gate pattern on a substrate, the gate pattern including a gate electrode of a thin film transistor and a gate line connected to the gate electrode;
    forming a gate insulating film on the substrate, covering the gate pattern;
    forming a source electrode and a drain electrode of the thin film transistor, a data line crossing the gate line to define a pixel region, a source/drain pattern including the data line, and a semiconductor pattern having an active layer overlapped with the source electrode, the drain electrode, and the data line and defining a channel between the source electrode and the drain electrode;
    forming a passivation film over the substrate having the thin film transistor;
    patterning the passivation film and the gate insulating film by an etching process using a photo-resist pattern to form passivation film pattern covering an area excluding an area having a transparent electrode pattern and to form at least one protrusion formed directly on the substrate, dividing the pixel region into a plurality of regions, each of the regions having a different liquid crystal alignment from the other regions;
    depositing a transparent electrode material over the substrate having the thin film transistor, the passivation film pattern and the photo-resist pattern;
    removing the photo-resist pattern and the transparent electrode material deposited thereon by a lift-off method to form the transparent electrode pattern, wherein the transparent electrode pattern is formed directly on the substrate and covers at least the pixel region; and
    forming a storage capacitor including the gate line and a storage electrode overlapping the gate line with the gate insulating film and the semiconductor pattern positioned therebetween,
    wherein forming the transparent electrode pattern includes forming a pixel electrode connected to the drain electrode and the storage electrode of the thin film transistor and covering the pixel region on the substrate excluding the passivation film pattern and the at least one protrusion, and
    wherein forming at least one protrusion includes forming a first protrusion and a second protrusion being substantially arranged in a first diagonal direction of the pixel region, and a third protrusion and a fourth protrusion being substantially arranged in a second direction crossing the first diagonal direction.

2. The method of claim 1, wherein the at least one protrusion is formed in a diagonal direction in the pixel region.

3. The method of claim 1, wherein the at least one protrusion includes an insulating pattern, which includes at least one insulating layer.

4. The method of claim 3, wherein the insulating pattern includes a first insulating layer formed on a co-plane along with the gate insulating pattern and made of a material identical to that of the gate insulating pattern, and a second insulating layer formed on a co-plane along with the passivation film pattern and made of a material identical to that of the passivation film pattern.

5. The method of claim 4, wherein the pixel electrode is formed on the substrate within the pixel region exposed by the gate insulating film and the passivation film pattern, the pixel electrode being connected to the drain electrode.

6. The method of claim 4, further comprising forming a semiconductor pattern and a metal layer between the first insulating layer and the second insulating layer.

7. The method of claim 3, wherein forming the at least one protrusion includes forming an insulating pattern with a material identical to that of the passivation film pattern on the gate insulating film.

8. The method of claim 7, wherein forming the transparent electrode pattern includes forming a pixel electrode on the gate insulation film within the pixel region exposed by the passivation film pattern, the pixel electrode being connected to the drain electrode.

9. The method of claim 1, wherein forming the source/drain pattern and the semiconductor pattern includes forming the semiconductor pattern on the gate insulating film and forming the source/drain pattern on the gate insulating film provided with the semiconductor pattern.

10. The method of claim 1, wherein forming the source/drain pattern and the semiconductor pattern includes simultaneously forming the semiconductor pattern and the source/drain pattern at a lower portion of the source/drain pattern along the source/drain pattern.

11. The method of claim 1, wherein forming the passivation film pattern includes partially exposing the drain electrode and the storage electrode to be connected to a pixel electrode.

12. The method of claim 1 or 3, wherein the passivation film pattern is made of any one of an inorganic insulating material and an organic insulating material.

13. The method of claim 1 or 3, wherein the passivation film pattern includes:
    a first passivation film layer made of an inorganic insulating material; and
    a second passivation film layer made of an organic insulating material on the first passivation film layer.

* * * * *